United States Patent
Kasahara

Patent Number: 5,535,384
Date of Patent: Jul. 9, 1996

[54] METHOD AND APPARATUS FOR CONTROLLING A HARDWARE MERGE SORTER TO SORT A PLURALITY OF RECORDS GREATER THAN $2^N$

[75] Inventor: Yasunori Kasahara, Kanagawa, Japan

[73] Assignee: Mitsubishi Denki Kabushiki Kaisha, Tokyo, Japan

[21] Appl. No.: 255,375

[22] Filed: Jun. 8, 1994

[30] Foreign Application Priority Data

Jul. 13, 1993 [JP] Japan ................. 5-173167

[51] Int. Cl.⁶ ................. G06F 7/14; G06F 7/16
[52] U.S. Cl. ................. 395/600; 395/800
[58] Field of Search ................. 395/600, 800, 395/425

[56] References Cited

U.S. PATENT DOCUMENTS

| | | | |
|---|---|---|---|
| 4,090,249 | 5/1978 | Chen et al. | 395/60 |
| 4,110,837 | 8/1978 | Chen | 395/800 |
| 5,146,590 | 9/1992 | Lorie et al. | 395/600 |
| 5,179,699 | 1/1993 | Iyer et al. | 395/650 |
| 5,307,485 | 4/1994 | Bordonaro et al. | 395/600 |

FOREIGN PATENT DOCUMENTS 1536651  11/1977  United Kingdom.

OTHER PUBLICATIONS

K. E. Batcher "Sorting Networks and their Applications" AFIPS Conference Proceedings vol. 32, pp. 307–314, 1968.

*Primary Examiner*—Thomas G. Black
*Assistant Examiner*—Peter Y. Wang
*Attorney, Agent, or Firm*—Wolf, Greenfield & Sacks

[57] ABSTRACT

A method and apparatus for controlling a hardware merge sorter to sort $N \geq 2^n$ number of records, the hardware merge sorter including a plurality of local processors that are cascaded in series, a plurality of local memories and a plurality of selectors. Each selector is coupled to and between one of the plurality of local memories and a respective local processor and couples the local memory to the respective processor during a first sorting step. In addition, the plurality of local memories are coupled to one local processor, of the plurality of local processors, during a second sorting step. With this arrangement, the hardware merge sorter can sort a plurality $N \leq 2^{n+1}$ number of records. In one particular embodiment of the present invention, a plurality of hardware merge sorter cells are cascaded in series. With this arrangement, the hardware merge sorter can sort a plurality $N \leq 2^{n+2}$ number of records.

22 Claims, 19 Drawing Sheets

CONVENTIONAL PIPELINE MERGE SORT METHOD (FIRST MERGE SORT STEP)

INVENTIVE MERGE SORT METHOD
(SECOND MERGE SORT STEP)

GENERAL IDEA OF INVENTIVE MERGE SORT METHOD

CONVENTIONAL PIPELINE MERGE SORT METHOD (FIRST MERGE SORT STEP )

INVENTIVE MERGE SORT METHOD (SECOND MERGE SORT STEP )

INVENTIVE METHOD OF TANDEM BASED MERGE SORT
FIG.13(a) FIRST AND SECOND MERGE SORT STEPS
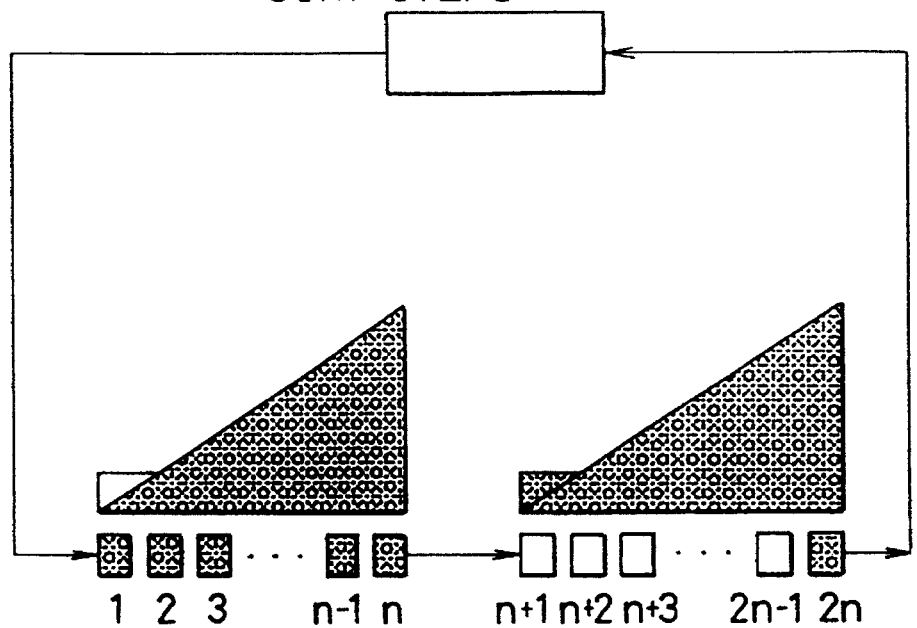
FIG.13(b) THIRD OR TANDEM BASED MERGE SORT STEP
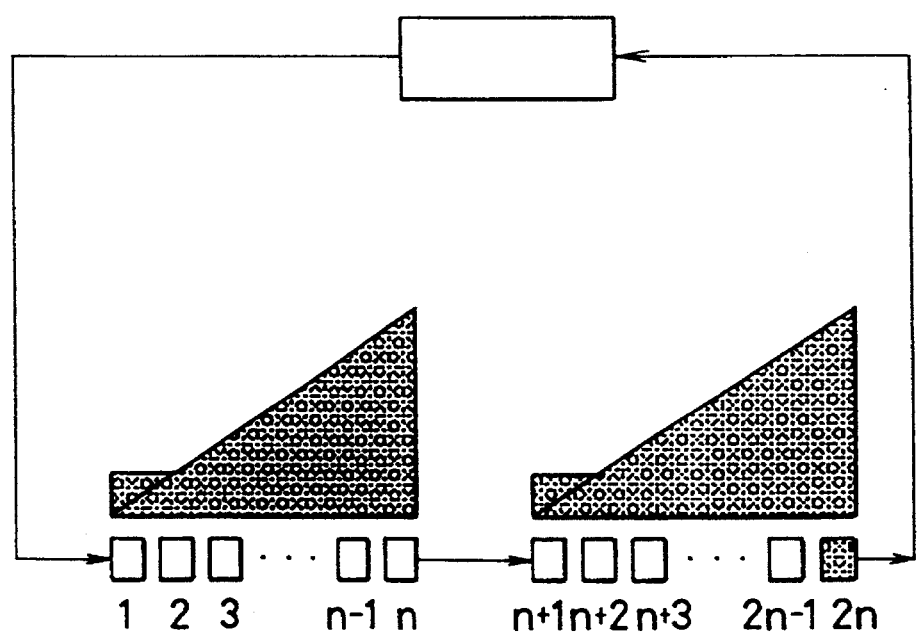

INVENTIVE MERGE SORT METHOD FOR SMALLER FILES

FIRST STEP

SECOND STEP
(STORAGE OPERATION)

SORT DATA INPUT BUS

PRIVATE MEMORY BUS

THIRD STEP
(PIPELINE MERGE SORT OPERATION)

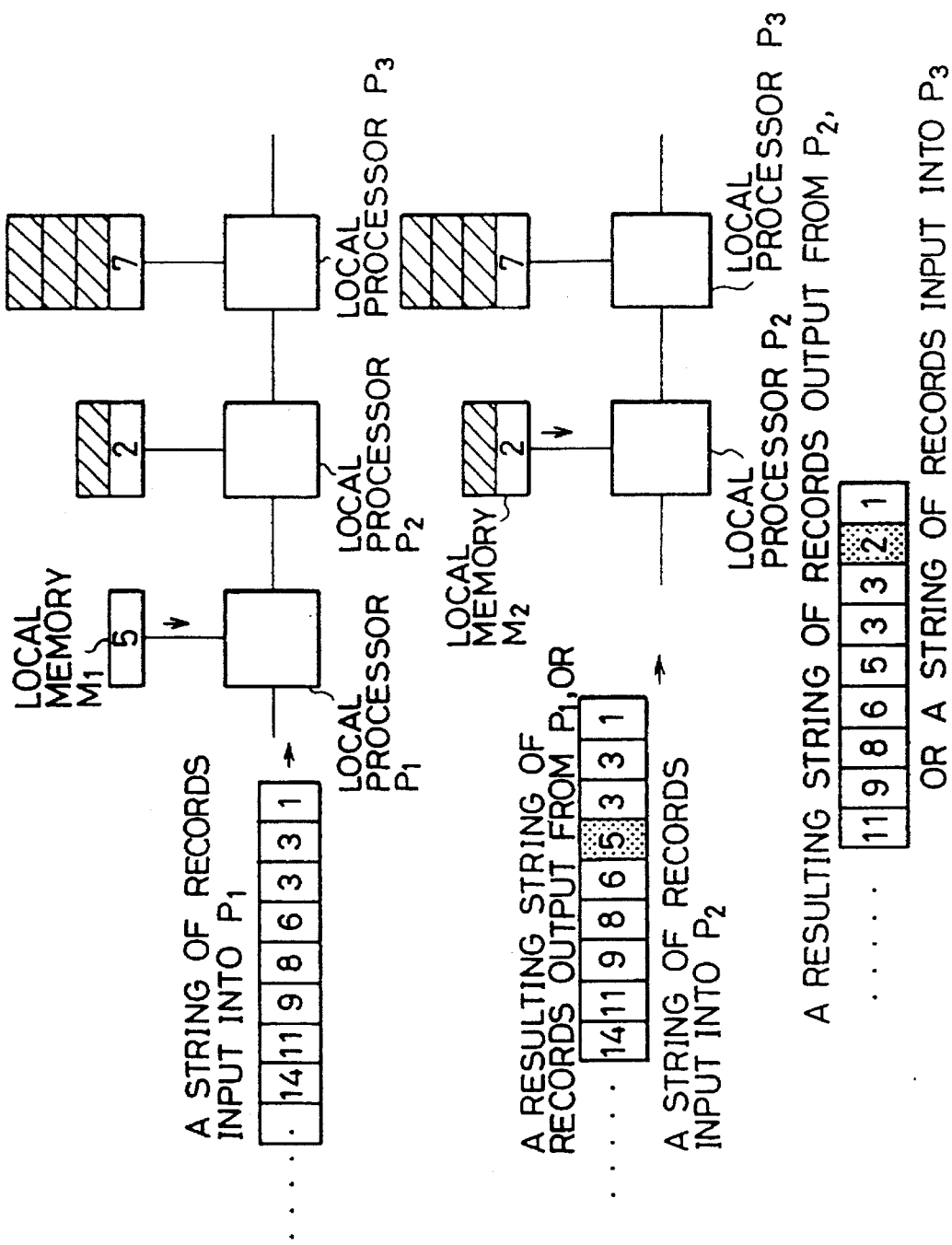

CONVENTIONAL PIPELINE MERGE SORT METHOD

METHOD AND APPARATUS FOR CONTROLLING A HARDWARE MERGE SORTER TO SORT A PLURALITY OF RECORDS GREATER THAN $2^N$

BACKGROUND OF THE INVENTION

1. Field of the Invention

The present invention relates to high-speed sorting in a sorting system and more specifically to a selector based high-speed sorting method and apparatus wherein a large amount of data can be processed at high speed.

2. Description of the Related Art

FIG. 16 shows an overall block diagram of a conventional sorting system which includes a hardware merge sorter of a conventional art disclosed in Japan Unexamined Patent Publication No.86043/1988.

The sorting system in FIG. 16 has a hardware merge sorter 22, an external memory or disk unit 30, a disk controller 31, a system controller 41 and a channel interface 42. Referring to the figure, a common data bus 40 transfers data between the system controller 41 and the channel interface 42. A data bus 43 transfers data between the channel interface 42 and a host computer. A data bus 32 transfers data between the disk unit 30 and the disk controller 31. A data bus 34 transfers data between the disk controller 31 and the common data bus 40. A sort data input bus 33 transfers sort data to the hardware merge sorter 22. A sorted data output bus 35 transfers sorted data from the hardware merge sorter 22 to the common data bus 40. The hardware merge sorter 22 has linearly ordered and cascaded in series n number of pipeline stages. Each pipeline stage has a sort element or local processor and a responsive private memory or local memory coupled to the local processor. Specifically, the first pipeline stage has a local processor $P_1$ 1 and a local memory $M_1$ 11 with a storage capacity of one ($2^0$) record; the second pipeline stage has a local processor $P_2$ 2 and a local memory $M_2$ 12 with a storage capacity of two ($2^1$) records; the third pipeline stage has a local processor $P_3$ 3 and a local memory $M_3$ 13 with a storage capacity of four ($2^2$) records, and so on through the last pipeline stage having a local processor $P_n$ 6 and a local memory $M_n$ 16 with a storage capacity of $2^{n-1}$ number of records. Each local processor is provided with an internal buffer. A line buffer is provided between neighboring local processors.

FIG. 17 shows a simplified block diagram of the conventional sorting system in FIG. 16. Referring to the figure, a local memory bus 106 transfers data between the local processor and the respective local memory in any pipeline stage of the hardware merge sorter 22. A sort controller 100 is a multi-functional unit which includes a large-scale buffer, the disk unit 30, the system controller 41, the disk controller 31, and a general-purpose processor.

Referring to FIG. 16, a stream of data to be sorted is read out by the disk controller 31 from the disk unit 30 and is generally transferred to the hardware merge sorter 22 through the data bus 32 and the sort data input bus 33. Otherwise, the stream of data is transferred to the host computer via the system controller 41 and the channel interface 42 and then travels back again to the disk controller 31 to be input to the hardware merge sorter 22 via the channel interface 42 and the system controller 41.

When the hardware merge sorter 22 receives sort data, the local processors $P_1$ 1 through $P_n$ 6, together with the responsive local memories $M_1$ 11 through $M_n$ 16, perform a series of pipeline merge sort operations. When the input data have been sorted through the pipeline stages, the resulting string of sorted data are output from the hardware merge sorter 22 to the common data bus 40 through the sorted data output bus 35. The stream of sorted data can then be transferred to the system controller 41 or to the host computer via the channel interface 42 through the data bus 43.

According to the conventional art, the conventional hardware merge sorter 22 in FIG. 16 or 17 can sort N ($N \leq 2^n$, with n as an integer) records with the n pipeline stages involving the local processors and local memories. The conventional hardware merge sorter 22 sorts data on a two-way merge basis. N number of records are serially input to the local processor $P_1$ 1 and through the pipeline stages, such that the records are put in order and a string of N sorted records is output. A two-way merge sort inputs and processes two strings of records stored in the storage units of the local memory and the internal buffer in each pipeline stage. When completing a two-way merge sort operation, the local processor transfers the resulting string of sorted records to the next local processor in the pipeline stage. For example, a local memory $M_i$ responsive to the local processor $P_i$ has a storage capacity of $2^{i-1}$ number of records. The local processor $P_i$ receives two strings of $2^{i-1}$ records consecutively from a local processor $P_{i-1}$ in the preceding pipeline stage and merges the two strings of records into a string of sorted $2^i$ number of records. The string of sorted $2^i$ number of records is output to a local processor $P_{i+1}$ in the contiguous pipeline stage for a further merge sort.

The basic operation of a two-way merge sort is now described in more detail in accordance with the conventional art in reference to FIG. 16 or 17. The operation has two phases of operation, a storage phase and a merge sort phase. The storage phase is a preliminary phase for the merge sort phase. In the storage phase, two strings of sorted records transferred consecutively from a preceding local processor in the pipeline stage are input to the local processor and are stored in the responsive local memory and the internal buffer respectively. In the merge sort phase, the local processor inputs one record, from each of the two stored strings, at a time for comparison. The pair of records are compared and put in order according to a given requirement. For example the records may be sorted in descending order from a highest initial value or in the ascending order from a lowest initial value. As a result, a record in an earlier order of the two is output from the local processor to be merged into a string of sorted records in the line buffer as a pipeline segment. The merge sort operation is repeated in this manner until there are no more records remaining in either storage units so that the resulting string of records are in order. The resulting string of sorted records are then transferred to the next local processor in the pipeline stage for a further merge sort. Thus, a two-way merge sort according to the conventional art doubles the amount of data in each pipeline stage by merging a pair of strings of records into a single string of sorted records.

FIG. 18 shows a conceptual diagram illustrating a series of the conventional pipeline merge sort operations according to the conventional sorting method. In the figure, a shaded triangle, actually with an exponential curve, illustrates the storage of the local memories and the shaded cubes are the sort elements or the local processors. According to FIG. 18, a stream of sort data is serially input in the local processor $P_1$ 1, processed through a series of the conventional merge sort operations and output in a resulting string of sorted data from the local processor $P_1$ 1. An accomplished string of sorted data is transferred to the sort controller.

With reference to a two-way merge sort, a string of sorted records in storage loses a heading record when the heading record is output for comparison to the local processor. The input order of a heading record in the local processor is random between the storage units depending upon the comparison result. To maintain the serial operation of outputting a heading record of a sorted string in storage, a heading address space of a storage unit for a heading record of a sorted string should always be occupied by a heading record of the remaining sorted string of records. In other words, a string of records in storage should shift one record or address space forward by each output in order to keep the sort sequence. It is vital to maintain the sort sequence of a sorted string of records in storage and to keep outputting a heading record without a break. In this respect, some measures or mechanisms have to be taken or considered to solve the problem.

A two-way merge sort is discussed hereinafter in terms of processing timing. Generally, a processing unit in data sorting can be a record, word or byte. The conventional art employs record based one-word processing. FIG. 19 shows a timing diagram illustrating record based one-word processing between neighboring local processors in a two-way merge sort operation.

According to FIG. 19, a record consists of two fields: a data section consisting of a certain number of words and a two-word pointer. Each word has three cycles: a read cycle R0, a read cycle R1 and a write cycle W. A two-way merge sort in accordance with the record based one-word processing basically works word by word through a record. A two-way merge sort should access three storage units, for a comparison in the merge sort step, including the local memory, the internal buffer in the local processor and the line buffer. In other words, the local processor inputs one word or record each from the two storage units for comparison in the read cycles R0 and R1 respectively, and outputs one of the two words or records as a comparison result in the write cycle W. Thus, a resulting string of records from each pipeline stage are in order on a word basis.

As stated hereinbefore, the conventional hardware merge sorter is generally configured with linearly ordered cascaded pipeline stages including a local processor and a responsive local memory which has twice a storage capacity as that of the local memory of the preceding pipeline stage. When the hardware merge sorter has n number of pipeline stages, a local memory in the last pipeline stage has a storage capacity of $2^{n-1}$ number of records, which accounts for a half of the total storage capacity of the local memories. According to the conventional art, the storage capacity of the local memory in the last pipeline stage limits the maximum number of records sortable in the conventional hardware merge sorter. In other words the conventional hardware merge sorter can only sort twice the amount of data as that of the storage capacity of the local memory in the last pipeline stage. This can simply be interpreted that there would be no ceiling for the amount of records sortable in the conventional sorting system as long as the total storage capacity of the local memories can expand. Theoretically tills is possible even in terms of a high-speed and efficient sorting. In reality, however, unlimited expansion of the pipeline stages including the local memories or the size of the hardware merge sorter is impossible in a computing system from an architectural or packaging viewpoint. The number of records exceeding the ceiling, in fact, have to be processed on a software basis. This presents a bottleneck and limits high-speed and efficient sorting.

SUMMARY OF THE INVENTION

Thus, it is an object of the present invention to provide a sorting system and method which accomplish a high-speed and efficient sorting of data in lager files using a conventional sized hardware merge sorter. This and other objects are accomplished by the sorting system and method of the present invention.

A sorting system for sorting a plurality of records according to the invention comprises:

(A) a hardware merge sorter, including:
  (A-1) a plurality of local processors cascaded in series, wherein each of the local processors receives records output by a prior local processor, sorts the records into a sorted data-string, and outputs the sorted data-string to a next local processor so that the hardware merge sorter produces at least one initially sorted data-string during a first sorting through the hardware merge sorter;
  (A-2) a memory having a storage capacity of $2^n$ number of records, including a plurality of local memories;
  (A-3) a plurality of selectors coupled to and between the local memory and the respective local processor, for coupling the local memory to the respective local processor during the first sorting, and for coupling a plurality of the local memory to a unique local processor for a second sorting; and (B) a controller for controlling the local processors and the selectors so that the hardware merge sorter produces a first and a second sorted data-strings of N number of records during the first sorting, and a sorted data-string of 2N number of records during the second sorting.

Further in accordance with the invention, in the sorting system, the plurality of local memories include at least two local memories, each of which has a storage capacity of $2^{n-1}$ number of records, and the selectors couple the two local memories to the unique local processor during the second sorting.

Further in accordance with the invention, the sorting system further comprises a private memory bus coupled between the controller and the plurality of selectors for transferring one of the first and second sorted data-strings from the controller to the local memories for the second sorting.

Further in accordance with the invention, in the sorting system, each of the local memories has a storage capacity of $2^{n-1}+1$ number of records, and each of the local memories is accessed by two of the local processors.

Further in accordance with the invention, a sorting system for sorting a plurality of records comprises:

(A) at least two hardware merge sorter cells cascaded in series, each cell including:
  (A-1) a plurality of local processors cascaded in series, wherein each of the local processors receives records output by a prior local processor, sorts the records into a sorted data-string, and outputs the sorted data-string to a next local processor so that the hardware merge sorter cell produces at least one initially sorted data-string during a first sorting through the hardware merge sorter cell;
  (A-2) a memory having a storage capacity of $2^n$ number of records, including a plurality of local memories;
  (A-3) a plurality of selectors coupled to and between the local memory and the respective local processor, for coupling the local memory to respective local processor during the first sorting, for coupling the plurality of the local memories to a first unique local processor for a second sorting, and for coupling the plurality of the local memories to a second unique local processor for a third sorting;

(A-4) a plurality of Input/output bus selectors cascaded in series with the plurality of local processor, for connecting the hardware merge sorter cells; and (B) a controller for controlling the local processors, the selectors and the input/output bus selectors to sort the plurality of records into four sorted data-strings of N number of records during the first sorting, to further sort the four sorted data-strings into two sorted data-strings of 2N number of records during the second sorting, and to sort the two sorted data-strings into a sorted data-string of 4N number of records during the third sorting.

Further in accordance with the invention, a method for sorting a plurality of records, using a hardware merge sorter including a plurality of local processors, a plurality of local memories and a plurality of selectors coupled to and disposed between the plurality of local memories and a respective local processor, for coupling the local memory to the respective local processor during a first sorting step, and for coupling the plurality of local memories to a unique local processor during a second sorting step, the method comprises the steps of:

(A) sorting N number of records into a first sorted data-string, using each of the local processors and each of the local memories during the first sorting step;

(B) sorting N number of additional records into a second data-string during the first sorting step;

(C) storing one of the first and second sorted data-strings in the plurality of local memories during the second sorting; and (D) sorting the other of the first and second sorted data-strings and the sorted data-string so as to produce a 2N number of records sorted data-string during the second sorting step.

Further in accordance with the invention, a method for sorting a plurality of records, using at least two hardware merge sorter cells, each hardware merge sorter cell including a plurality of local processors, a plurality of local memories, a plurality of selectors coupled to and disposed between the plurality of local memories and a respective local processor, for coupling the local memory to the respective local processor during a first sorting step, for coupling the plurality of local memories to a unique local processor during a second sorting step, and a plurality of input/output bus selectors cascaded in series with the plurality of local processors which connect the hardware merge sorter cells during the second and third sorting steps, the method comprises the steps of:

(A) sorting N number of records into a first sorted data-string, using each of the local processors and each of the local memories in a first hardware merge sorter cell during the first sorting step;

(B) storing the first sorted data-string in the plurality of local memories of a second hardware merge sorter cell;

(C) sorting N number of additional records into a second data-string during the first sorting step in the first hardware merge sorter cell;

(D) sorting, during the second sorting step, the second sorted data-string and the stored first sorted data-string stored in the second hardware merge sorter cell so as to produce a first 2N number of records sorted data-string;

(E) sorting a second 2N number of other records into a second 2N number of records sorting data-string, using the first and second hardware merge sorter cells by repeating steps (A) to (D);

(F) storing one of the first and second 2N number of data-strings in the plurality of local memories in the first and second hardware merge sorter cells during the third sorting step; and, (G) sorting the other of the first and second 2N number of data-strings and stored 2N number of data-strings so as to produce a 4N number of sorted records data-string during the third sorting step.

Further in accordance with the invention, a method for sorting a plurality of records, using a hardware merge sorter including a plurality of local processors, and a plurality of local memories, the method comprises the steps of:

(A) sorting N number of records into a first sorted data-string, using each of the local processors and each of the local memories during a first sorting step;

(B) storing one record out of a remaining number of records in each of the local memories;

(C) sorting the first sorted data-string and the one record stored in each of the plurality of local memories in a second sorting step; and, (D) if necessary, repeating steps (B) and (C) at least one more time to produce a string of a sorted number of records.

Further in accordance with the invention, the sorting system further comprises sort end signal lines disposed between each respective plurality of local processors and the controller, so that each respective processor can inform the controller when it has completed the first sorting and the controller can store a portion of one of the two initially sorted data-strings in the respective local memory.

BRIEF DESCRIPTION OF THE DRAWINGS

In the drawings.

FIG. 13 shows conceptual diagrams illustrating the tandem based sorting method of the invention in a multi-sorter system according to the third embodiment;

FIG. 15 shows a concrete example of serial pipeline merge sort operations according to the inventive sorting method in the fifth embodiment;

DETAILED DESCRIPTION OF PREFERRED EMBODIMENTS

Embodiment 1.

Figure 1:
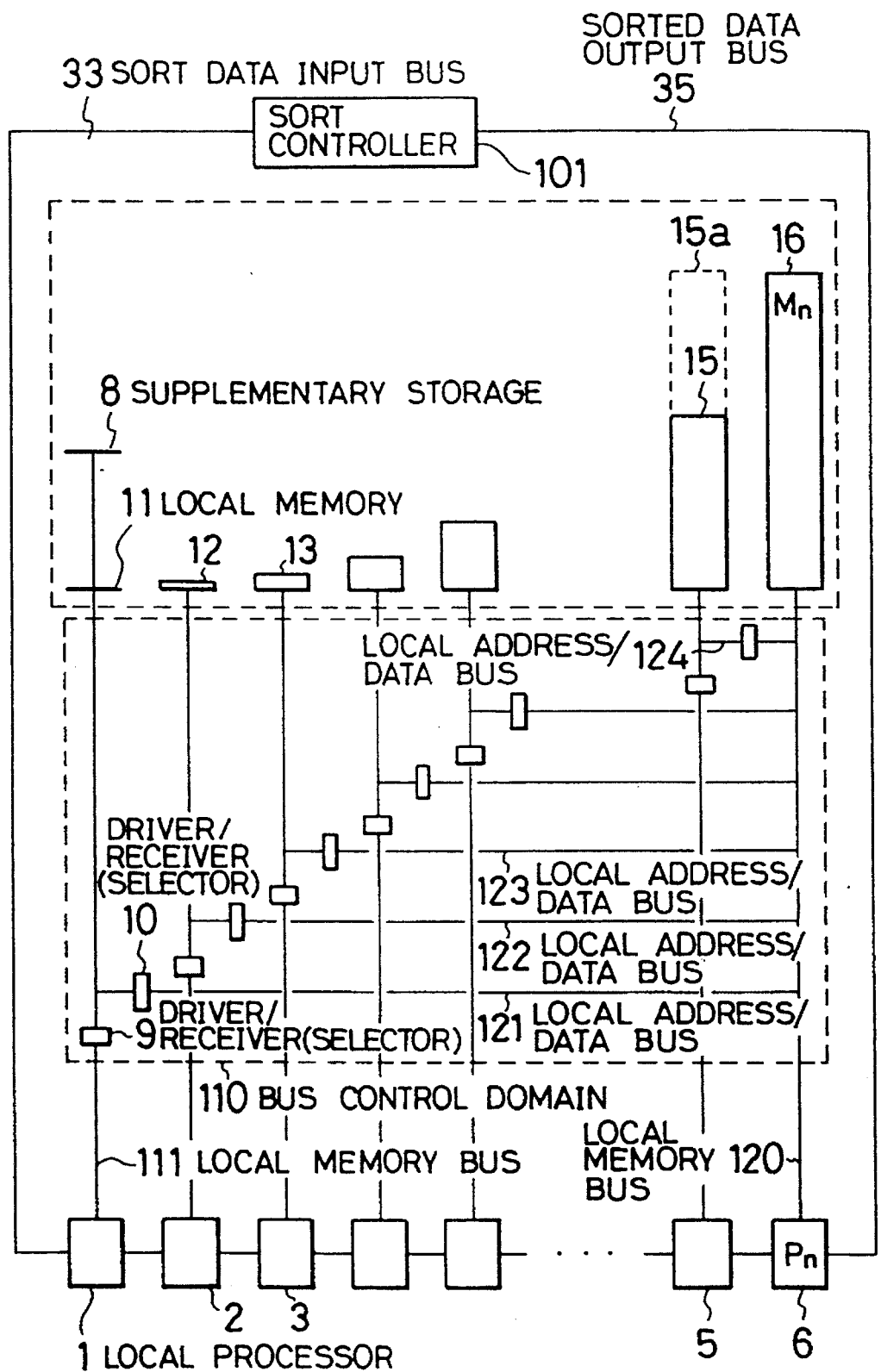
FIG. 1 shows a simplified block diagram of a sorting system of the invention illustrating a hardware merge sorter configuration and a sort controller according to first and second embodiments.
Figure 16:
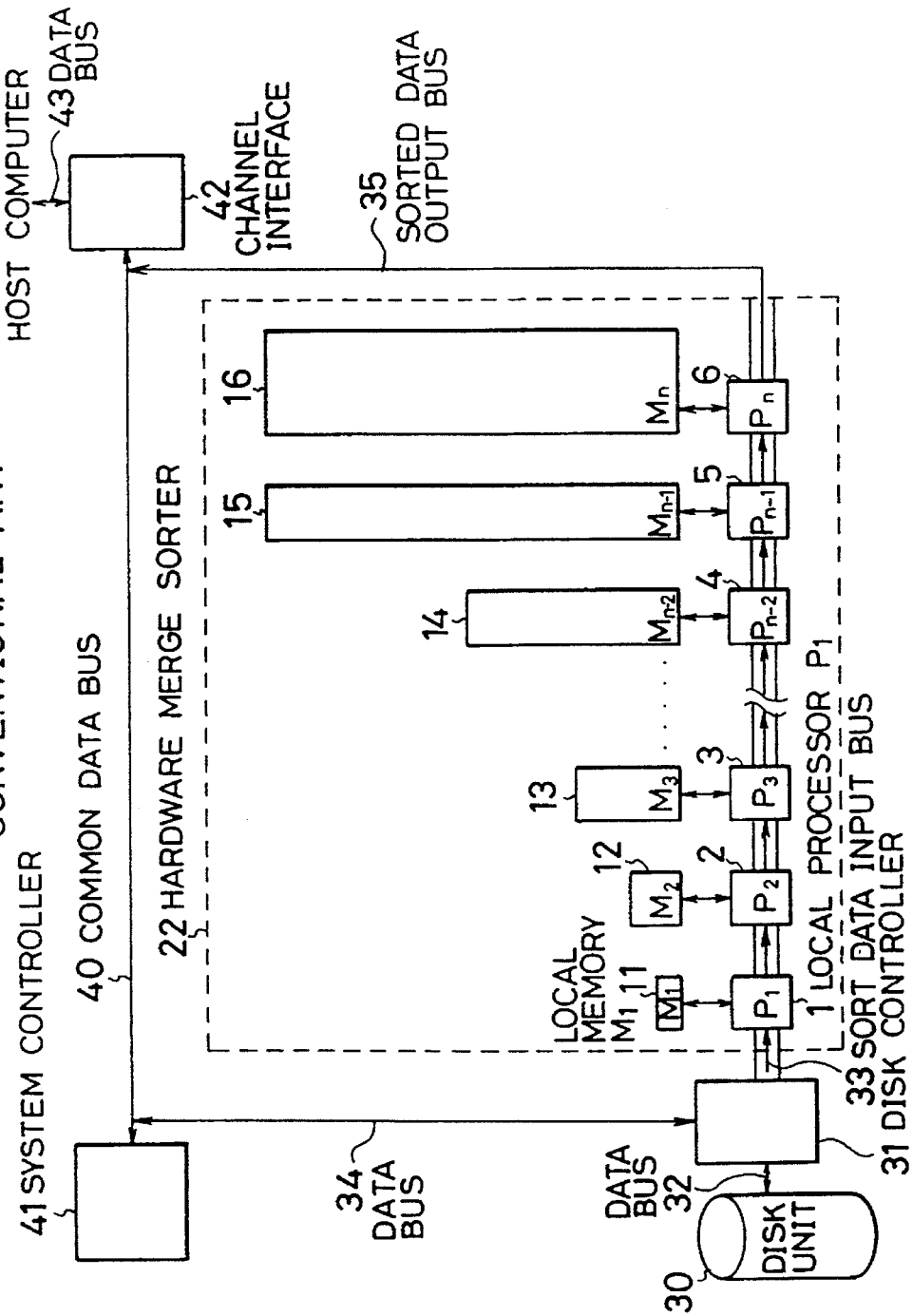
FIG. 16 shows an overall block diagram of a conventional sorting system.
Figure 17:
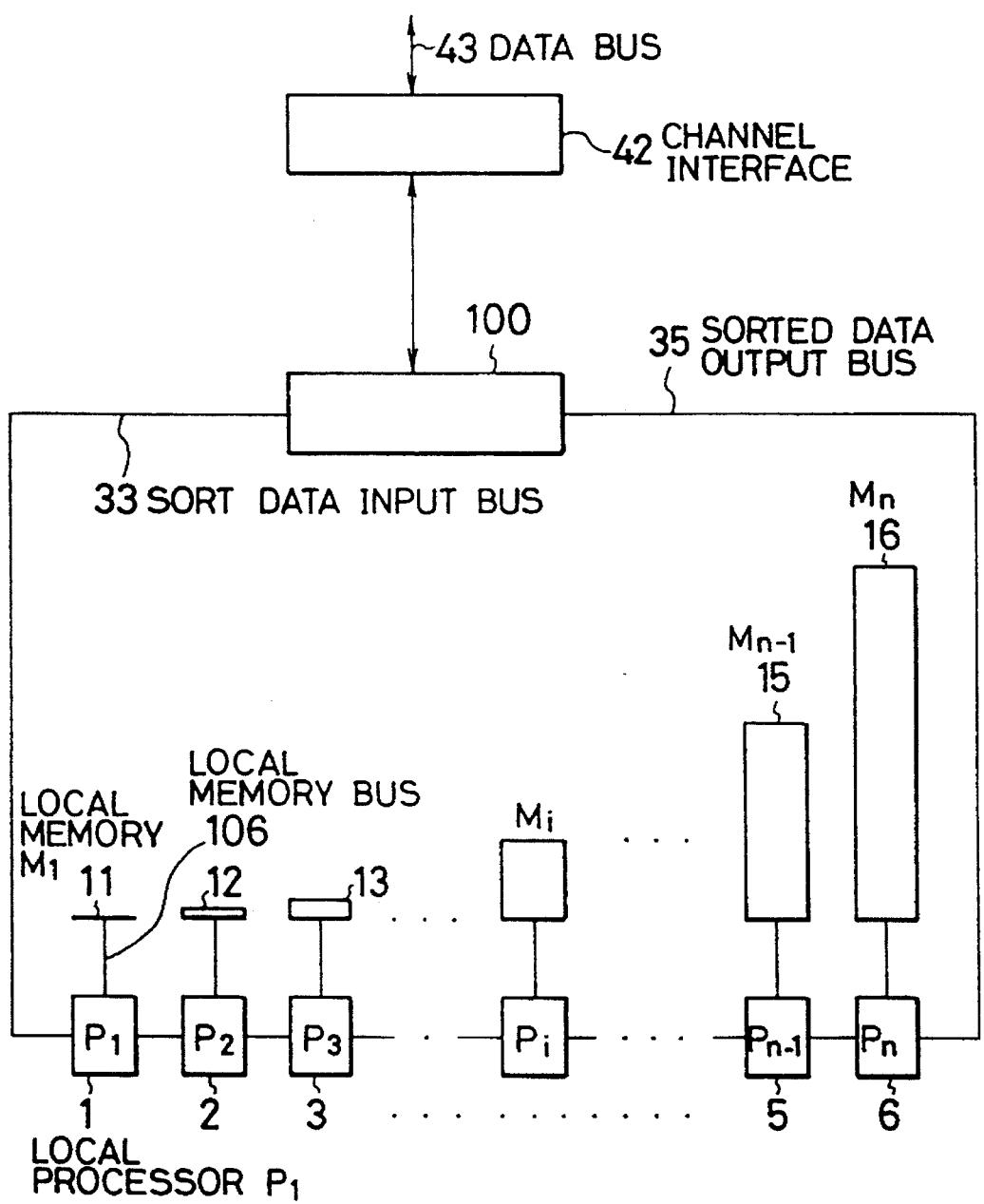
FIG. 17 shows a simplified block diagram of the conventional sorting system in FIG. 16.
Figure 18:
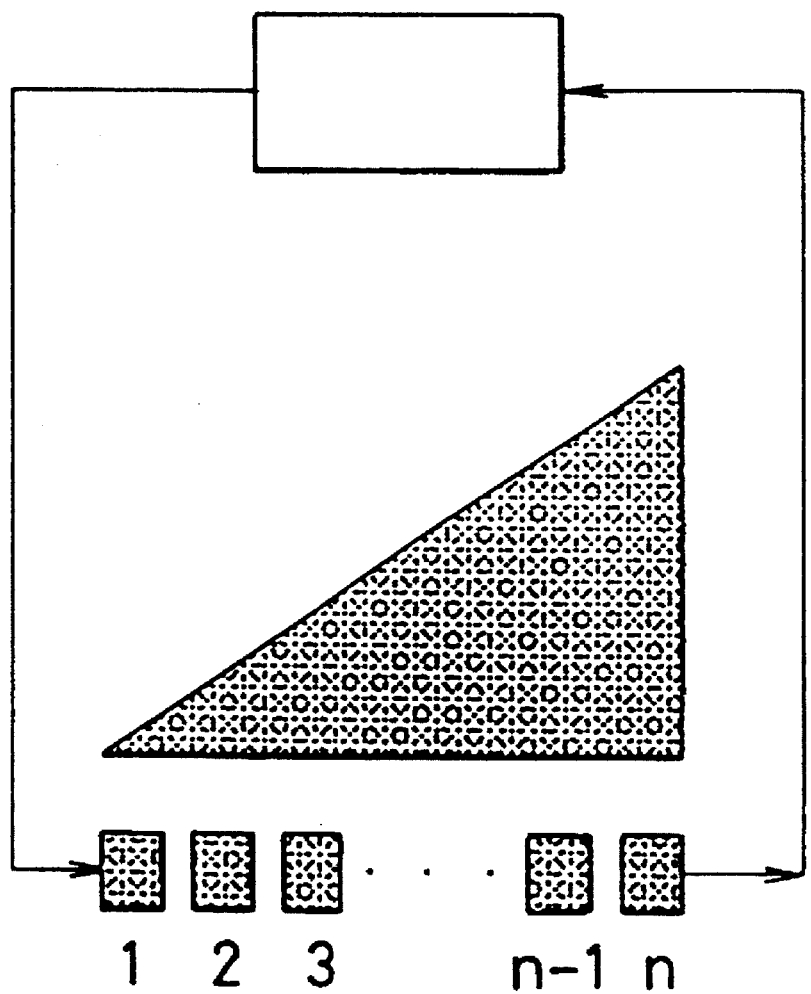
FIG. 18 shows a conceptual diagram illustrating a conventional sorting method.
Figure 19:
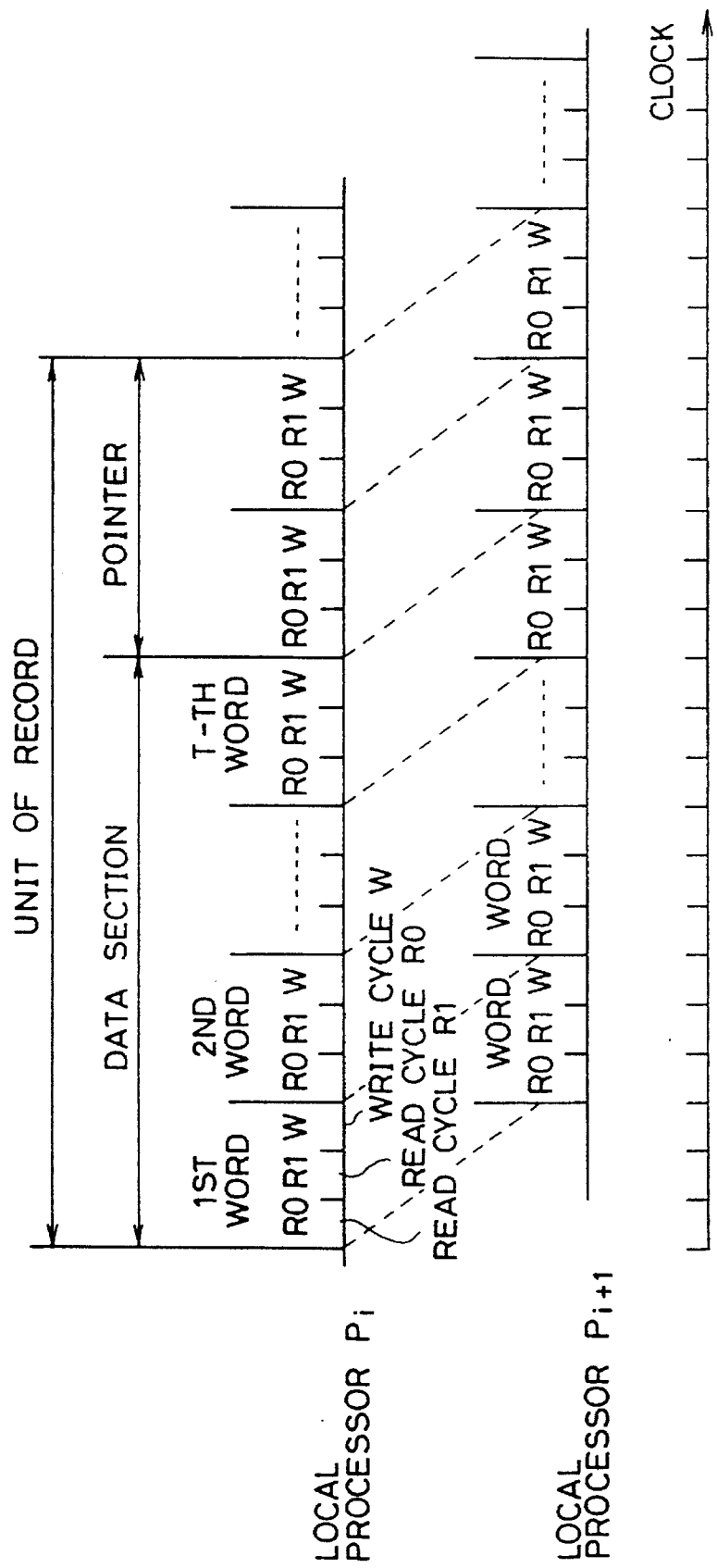
FIG. 19 shows a timing diagram illustrating a record based one-word processing in a two-way merge sort operation.

FIG. 1 shows a block diagram of a sorting system of the present invention illustrating a hardware merge sorter configuration and a sort controller in accordance with a first embodiment. The hardware merge sorter in FIG. 1 comprises the conventional hardware merge sorter in FIG. 17, as modified by adding a supplementary storage 8 having a storage capacity of one record, a bus control domain 110, a local memory bus 111 instead of the local memory bus 106 and a local memory bus 120. The bus control domain 110 includes selectors or drivers/receivers 9 and 10 and local address/data buses 121 through 124. The hardware merge sorter is consisted of n number of pipeline stages including a local processor $P_1$ 1 in the first pipeline stage, a local processor $P_2$ 2 in the second pipeline stage, a local processor $P_3$ 3 in the third pipeline stage and so on through a local processor $P_{n-1}$ 5 in the second to the last pipeline stage and a local processor $P_n$ 6 in the last pipeline stage. Each local processor has a responsive local memory connected through the local memory bus 111 via the driver/receiver 9 in the bus control domain 110. A memory includes a local memory $M_1$ 11, a local memory $M_2$ 12, a local memory $M_3$ 13, and so on through a local memory $M_{n-1}$ 15 and a local memory $M_n$ 16, respectively coupled to the local processors $P_1$ 1 through $P_n$ 6. When completed a whole series of merge sort operations, the local processor $P_n$ 6 outputs sorted data to a sorted data output bus 35. A sort controller 101 is a multi-functional unit including the system controller 41 and the disk controller 31 In FIG. 16. The sort controller 101 transfers sort data to the hardware merge sorter through a sort data input bus 33. The sorted data are transferred to the sort controller 101, and otherwise to the host computer via the channel interface 42 and the data bus 43 as shown in FIG. 16.

The sorting system of the invention is characterized by unique and exclusive operations assigned uniquely or exclusively to a unique local processor or the local processor $P_n$ 6 controlled by the sort controller 101 and the driver/receiver 10. For the purpose of the unique operations, the local processor $P_n$ 6 can access all the local memories in the pipeline stages including the supplementary storage 8 by way of the local address/data buses 121 through 124.

Figure 2:
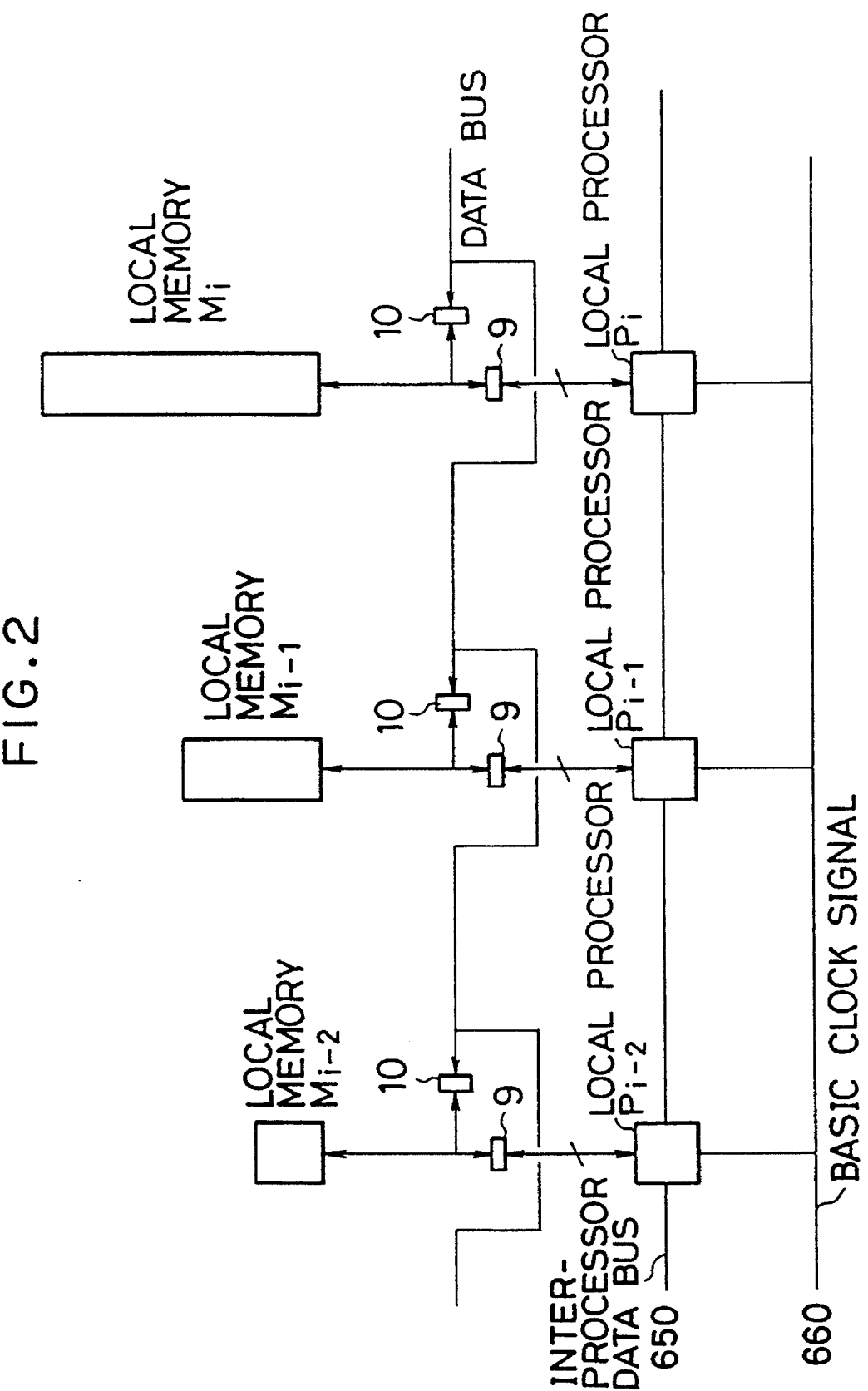
FIG. 2 shows a general partial block diagram of a data bus architecture of the bus control domain 110 of FIG. 1, illustrating a data control technique according to the first embodiment.
Figure 3:
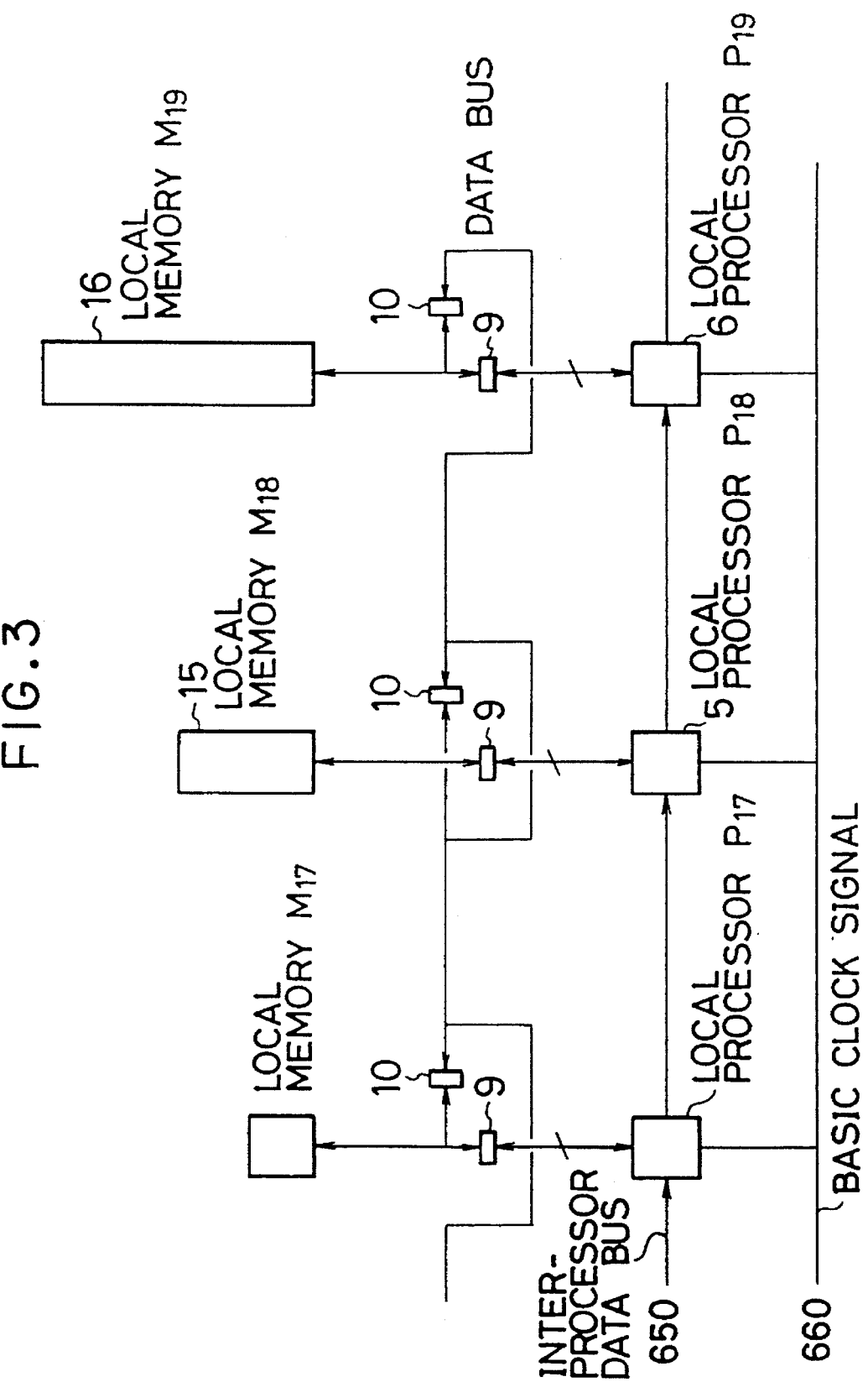
FIG. 3 shows a partial block diagram of the data bus architecture further illustrating the data control technique in FIG. 2.
Figure 4:
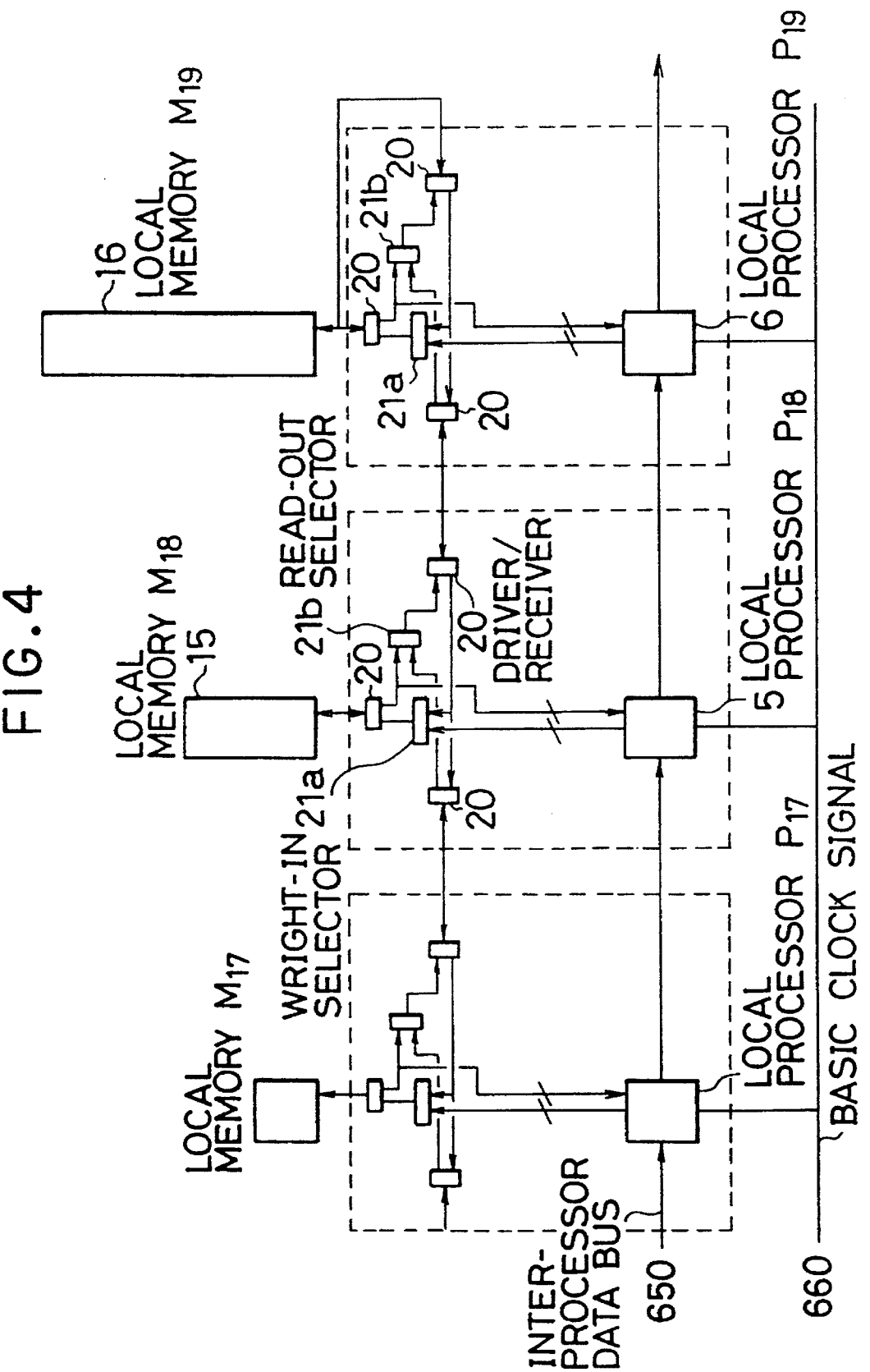
FIG. 4 shows a partial block schematic diagram illustrating a selector based data control technique implemented in an LSI according to the first embodiment.

FIGS. 2 through 4 show partial block diagrams of a data bus architecture in the bus control domain 110 of FIG. 1, illustrating data control techniques between the local processors and the local memories according to this embodiment. Referring to FIG. 2, a basic clock signal 660 provides signals for synchronization among the local processors. An inter-processor data bus 650 transfers strings of sorted data from a local processor to the next local processor in the pipeline stage. FIG. 2 is referred to illustrate the data bus architecture for a bidirectional data control technique by the drivers/receivers 9 and 10. Data are transferred between a pair of the local processors and the responsive local memories in the pipeline through the driver/receiver 9 when a merge sort operation is performed by each processor within the pipeline. On the other hand, data are transferred between each local memory and the unique local processor through the plurality of drivers/receivers 10.

FIGS. 3 and 4, based on FIG. 2, show the last three pipeline stages of the inventive hardware merge sorter under the condition that the hardware merge sorter has 19 pipeline stages (n=19). FIG. 3 illustrates the data control technique in FIG. 2 in this situation.

FIG. 4 illustrates a selector-based bus control domain implemented in an LSI based configuration. The LSI circuits are designated by dotted squares in FIG. 4 and include a set of write-in and read-out selectors 21a and 21b, three input/output buffers 20 (driver/receiver) and a local processor. The write-in selector 21a selects a stream of data to be written into the local memory from either the local processor in the LSI when a merge sort operation is performed within each pipeline stage, or from the unique local processor $P_{19}$ 6 for the unique storage operation performed only by the local processor $P_{19}$ 6. The read-out selector 21b selects a stream of data, to be transferred to the unique local processor for the unique merge sort operation, from the local memory in the pipeline stage, or from an LSI in the preceding pipeline stage.

Figure 5:
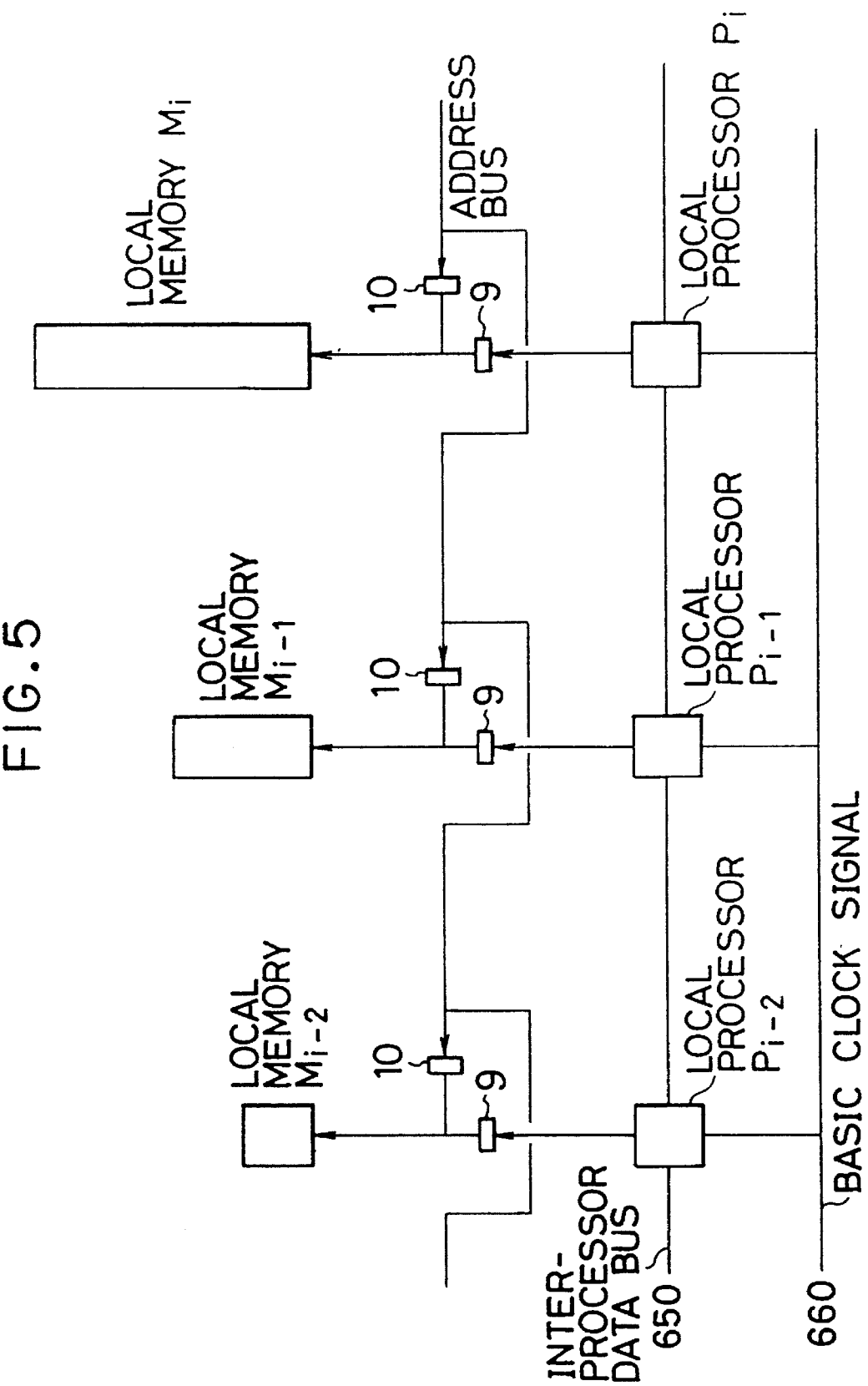
FIG. 5 shows a general block diagram, illustrating an address control technique according to the first embodiment.
Figure 6:
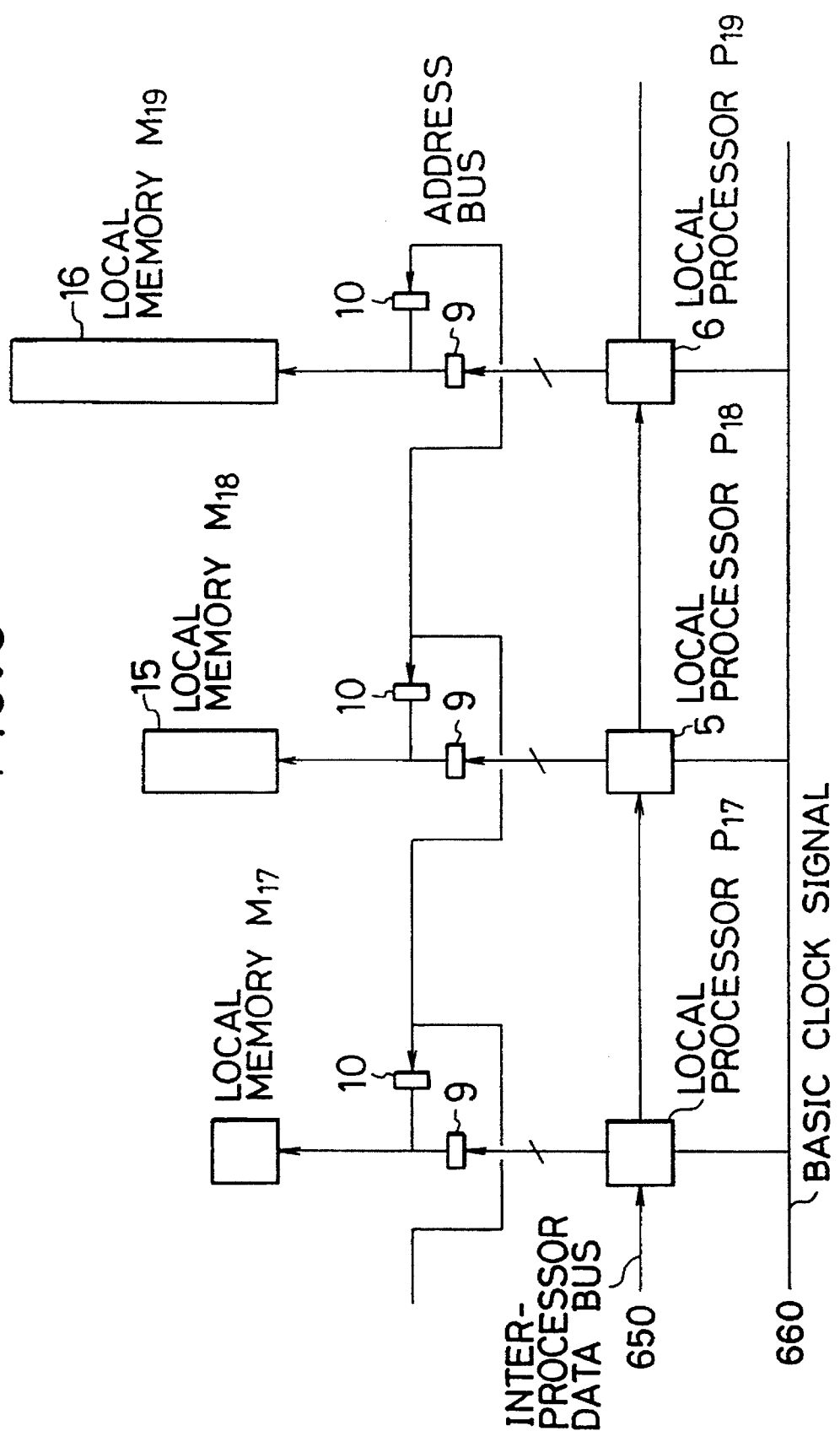
FIG. 6 shows a partial block diagram of the address bus architecture further illustrating the address control technique in FIG. 5.
Figure 7:
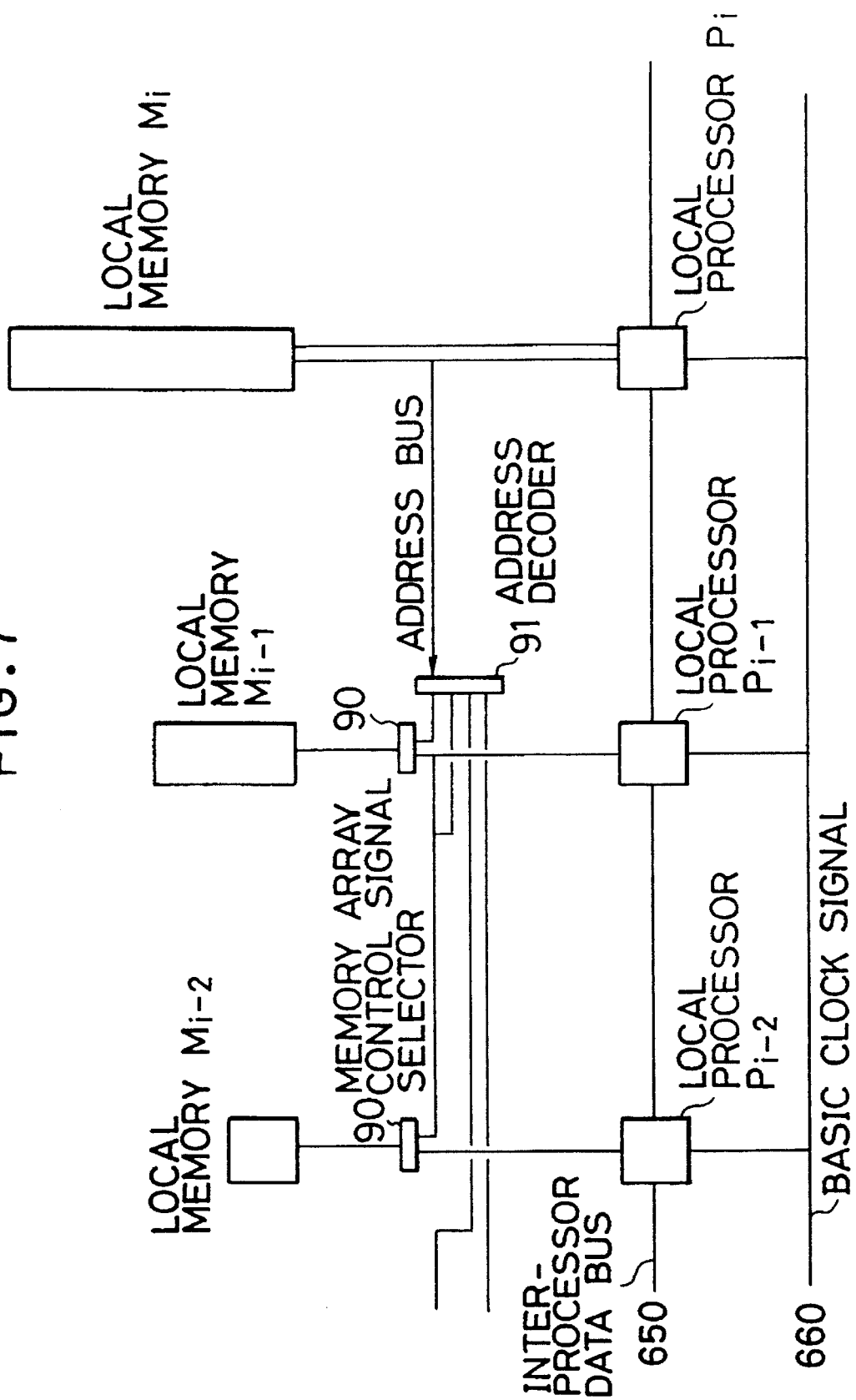
FIG. 7 shows a partial block diagram of an address bus architecture illustrating a control signal based data control technique according to the first embodiment.

FIGS. 5 through 7 show partial block diagrams of the address bus architecture in the bus control domain 110 of the hardware merge sorter in FIG. 1, illustrating address control techniques between the local processors and the local memories according to this embodiment. FIG. 5 is a general view of the address bus architecture illustrating an address control technique controlled by the drivers/receivers 9 or 10. FIG. 6, based on FIG. 5, shows the last three pipeline stages in the hardware merge sorter under the condition that the hardware merge sorter has 19 pipeline stages.

Referring to FIG. 6, the driver/receiver 9 becomes ENABLED when the driver/receiver 10 is DISABLED for transferring address-data from the local processor to the responsive local memory in each pipeline stage when a merge sort operation is performed by each pipeline stage. On the other hand, the driver/receiver 9 becomes DISABLED when the driver/receiver 10 ENABLED for transferring address-data from the unique local processor $P_n$ 6 to each local memory in the pipeline stages when the local processor $P_n$ 6 is performing storage and merge sort operations using the local memories in all the pipeline stages.

With further reference to the address-data control techniques hereinbefore described, a chip select signal can be used when the local memories are a SRAM. When the local memories are a DRAM, an address control signal such as a column address strobe signal can be used. FIG. 7 shows another address control technique for the case of a DRAM memory. According to FIG. 7, the address control signal is generated in an address decoder 91 based on address data on the address bus. A memory array control signal selector 90 controls writing of address data to the local memory in each pipeline stage by selecting a bus either from the local processor in the pipeline stage or from the address decoder 91.

Figure 8:
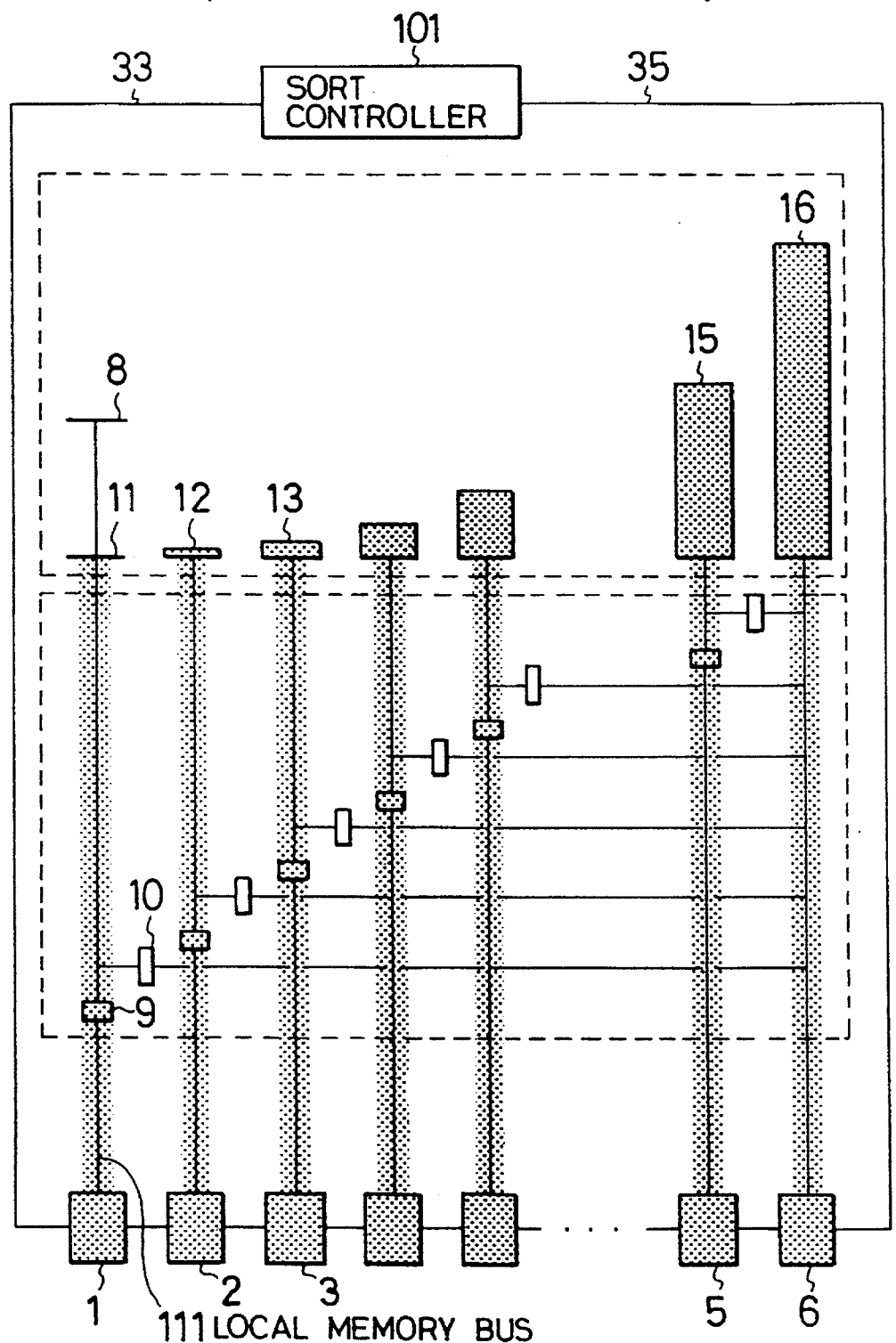
FIG. 8 shows a block diagram of the sorting system of the invention illustrating a series of the conventional pipeline merge sort operations in a first merge sort step by the hardware merge sorter according to the first embodiment.
Figure 9:
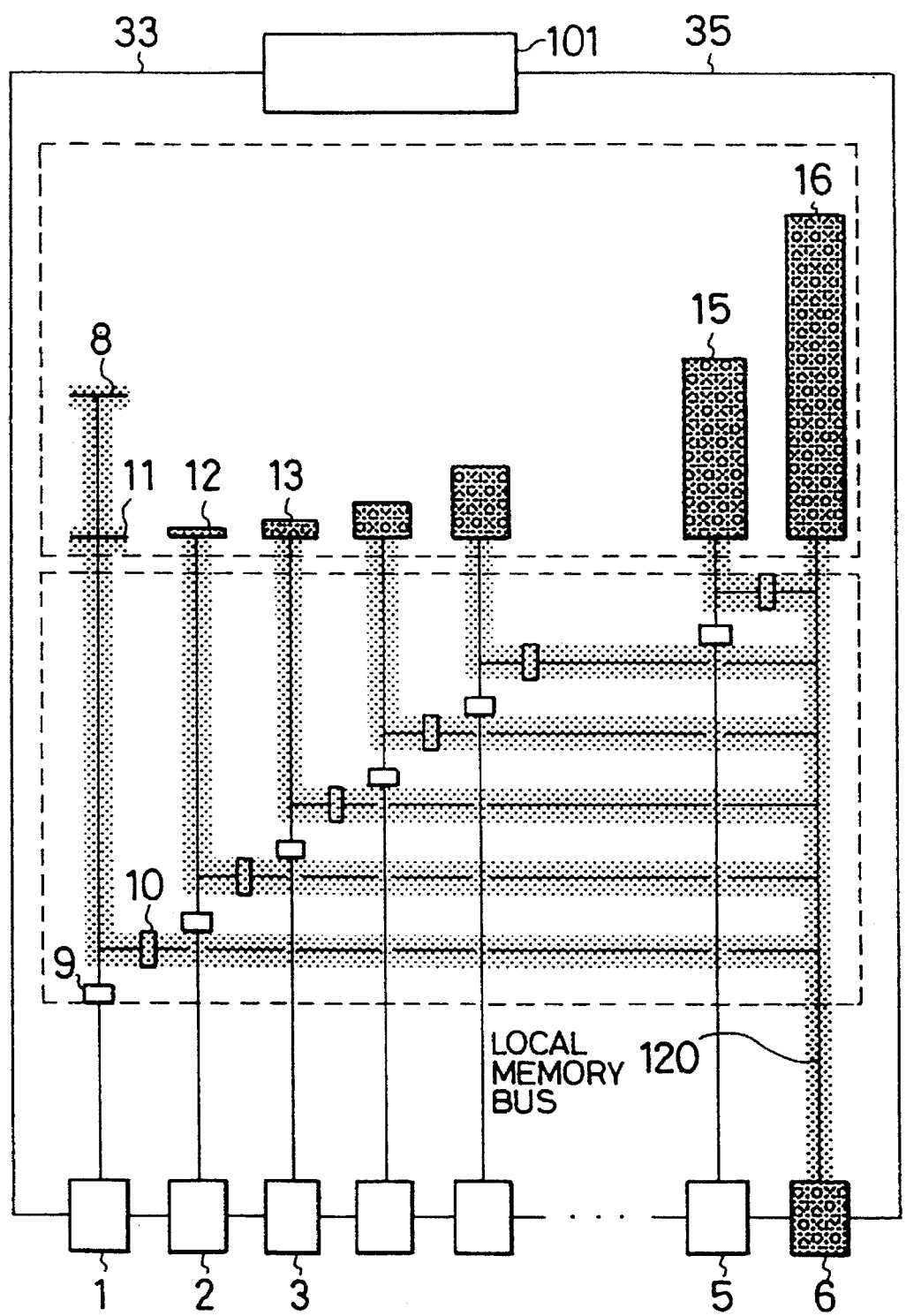
FIG. 9 shows a block diagram of the sorting system of the invention illustrating unique storage and merge sort operations performed in a second merge sort step according to the first embodiment.

The basic operation of the inventive hardware merge sorter according to this embodiment in FIG. 1 is now described with reference to FIGS. 8 and 9. FIGS. 8 and 9 show a series of the inventive merge sort operations in the inventive hardware merge sorter involving the first and second merge sort steps. FIG. 8 illustrates how each local processor can access its responsive local memory utilizing the driver/receiver 9 for the first merge sort step of the sorting. The series pipeline merge sort operations in this stage are the same as those of the conventional art except for the bus control by the driver/receiver 9. FIG. 9 illustrates how the local processor $P_n$ 6 can uniquely access the local memories of all the pipeline stages using the local address/data buses 121 through 124 and the driver/receiver 10 in the bus control domain 110 for the second merge sort step of the sorting.

As stated hereinbefore, the conventional sorting method can sort N number ($N \leq 2^n$) of data. On the other hand, when N' of data in the range of over $2^n$ to $2^{n+1}$ of records ($2^n < N' \leq 2^{n+1}$) are to be sorted, the inventive sorting method of the present invention has to be applied to sorting such a larger amount of data. In the unique sorting method of the present invention, the amount of data in a larger file are to be sorted twice through the inventive hardware merge sorter using a combination of the conventional and inventive sorting methods as shown in FIGS. 8 and 9. The N' number of records are serially input in the inventive hardware merge sorter and sorted through a series of the conventional pipeline merge sort operations for the first sorting as shown in FIG. 8. Consequently, the hardware merge sorter outputs consecutively the resulting strings of $2^n$ and $N'-2^n$ number of initially sorted records to the sorted data output bus 35. These strings are transferred to the sort controller 101.

The resulting two strings of initially sorted records from the first merge sort step in the sort controller 101 are sorted again in the inventive hardware merge sorter for the second sorting by the second merge sort step as shown in FIG. 9. The second merge sort step features the unique and exclusive operations performed only by the local processor $P_n$ 6. For the purpose of the unique operation, the local memories for all the pipeline stages are controlled to be responsive only to the local processor $P_n$ 6 by way of the local address/data buses 121 through 124 controlled by the drivers/receivers 10 in the bus control domain 110. In other words, the local processor $P_n$ 6 performs uniquely the storage or merge sort operation with a unified memory of the local memories in all the pipeline stages $M_1$ 11 through $M_n$ 16 and M 8 such that the unified memory have a storage capacity of $2^n$ number of records. The second merge sort step consists of two different operations of storage and merge sort. In the storage operation, one of the two strings of initially sorted records is stored in the unified memory through the unique local processor. For the purpose of the unique operation, the sort controller 101 can put a kind of skipping flag at the front of the string and transfer the string directly to the local processor $P_n$ 6 by skipping over the other local processors $P_1$ 1 through $P_{n-1}$ 5. When receiving the string of records, the local processor $P_n$ 6 starts accessing the unified memory for storing the input data. After transferring the data to the unified memory, the local processor $P_n$ 6 is now ready for the unique merge sort operation. In terms of a successful storage operation in this stage, the discussions made on address/data control techniques involving the drivers/receivers should be considered with reference to FIGS. 2 through 7.

When the storage operation has been completed, the sort controller 101 transfers the remaining string of the initially sorted records to the hardware merge sorter through the sort data input bus 33 for the unique merge sort operation. The string is also transferred straight to the local processor $P_n$ 6 due to the skipping flag. When received the string of records, the local processor $P_n$ 6 starts to merge the string uniquely with the string in the unified memory. Consequently, an accomplished string of N' number of sorted records is output from the local processor $P_n$ 6 to the sorted data output bus 35. This completes a whole series of the Inventive merge sort operations according to this embodiment.

As described hereinbefore, the hardware merge sorter of the invention according to this embodiment is capable of sorting larger data files. When processing N' or 2N ($=\Sigma Ni$) number of sort records, the inventive hardware merge sorter merges the records into two sorted strings N1 and N2 in the first merge sort step. In the second merge sort step, the hardware merge sorter merges the two strings of initially sorted records N1 and N2 into an accomplished string of 2N number of secondly sorted records.

Thus, the sorting system of the invention according to this embodiment can contribute greatly to an improved high-speed sorting with a conventional sized hardware merge sorter capable of sorting a larger amount of records than $2^n$ number of records which is the maximum number that the conventional hardware merge sorter can manage to sort.

The sorting method of this invention discussed in this embodiment is executable upon the hardware merge sorter of the conventional art. However, some selecting techniques or mechanisms such as selectors or drivers/receivers are required in order to effect the inventive unique merge sort operation in the second merge sort step.

FIG. 12 shows conceptual diagrams illustrating the sorting method of the invention executable upon the conventional hardware merge sorter. In the figure a triangle represents the local memories, the boxes represent the local processors, a rectangle stands for the sort controller and arrows indicate a direction of data flow. A shading of the symbols indicates that its function is in execution. According to this embodiment, the hardware merge sorter can sort N' records in the range of over $2^n$ to $2^{n+1}$.

Figure 12A:
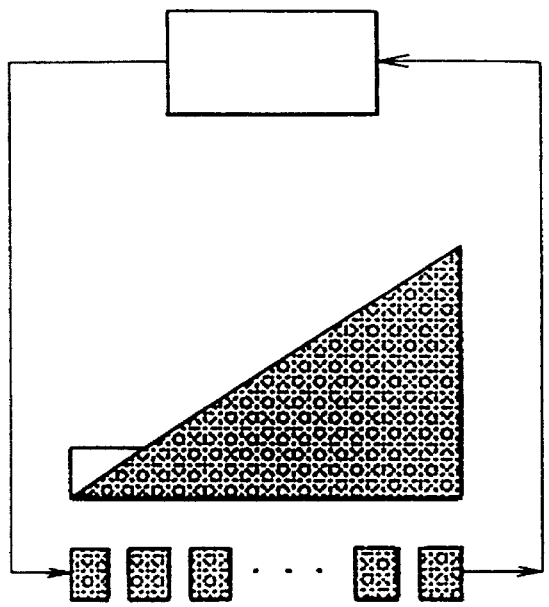
FIG. 12 shows conceptual diagrams illustrating the basic sorting method of the invention according to the first embodiment.

FIG. 12(a) illustrates a series of the conventional pipeline merge sort operations in the first merge sort step. According to this embodiment, N' number of records are sorted into two initially sorted strings through the first merge sort step in the manner discussed in the following two steps (S1-1 and S1-2).

S1-1: $2^n$ number of records are processed through a series of the conventional pipeline merge sort operations and transferred to the sort controller in a string $N_1$ of initially sorted $2^n$ number of records.

S1-2: The remaining $N-2^n$ number of records are processed consecutively in the same manner as that stated in S1-1 and transferred to the sort controller in a string $N_2$ of initially sorted $N'-2^n$ number of records.

Figure 12B:
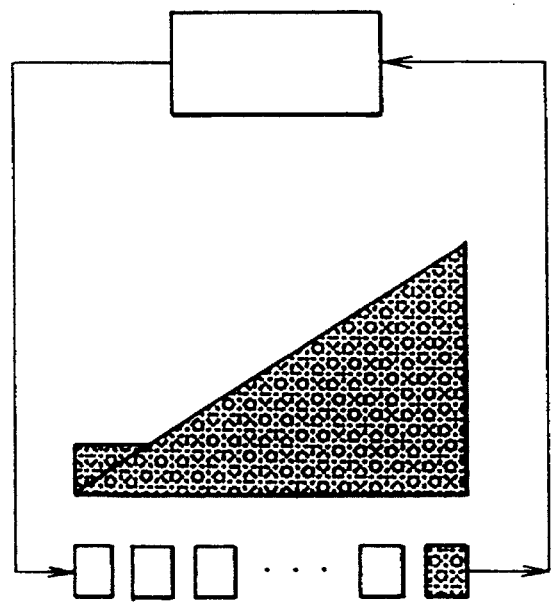

FIG. 12(b) illustrates the unique operations in the second merge sort step. This stage includes the following two steps (S2-1 and S2-2) of storage and merge sort operations.

S2-1: The string $N_1$ of initially sorted $2^n$ number of records is transferred directly to the unique local processor in the last pipeline stage from the sort controller for the unique storage operation. The local processor transfers the string $N_1$ to the unified memory for the unique operation including an additional supplementary storage having additional one record storage capacity.

S2-2: When the unique storage operation is completed, the string $N_2$ of initially sorted $N'-2^n$ number of records is transferred from the sort controller to the unique local processor for the unique merge sort operation. The local processor merges the two strings of $N_1$ and $N_2$ through the unique merge sort operation and outputs an accomplished string of sorted N' ($2^n<N'\leq 2^{n+1}$) number of records.

Embodiment 2.

With further reference to the first embodiment, the hardware merge sorter of the present invention can provide another local memory 15a in FIG. 1 having the same storage capacity of $2^{n-1}$ records as that of the last local memory 16 in the pipeline stage. This means that the storage capacity of the two local memories accounts for all the storage capacity of the local memories in all the pipeline stages in FIG. 1. In other words, the unique local processor $P_n$ 6 only has to access the two local memories, instead of all the local memories, in the second merge sort step. From an architectural point of view, the inventive hardware merge sorter according to this embodiment, would be expanded in size in terms of the total storage capacity of the local memories due to the additional storage capacity in a local memory on the one hand. On the other hand, the inventive hardware merge sorter would be reduced in terms of the size or scale of the bus control domain 110 required due to a simpler bus structure in the second merge sort step for accessing only the two local memories. In this respect, the hardware merge sorter according to this embodiment is advantageous in the unique operations in terms of address/data control in the second merge sort step.

Embodiment 3.

Figure 10:
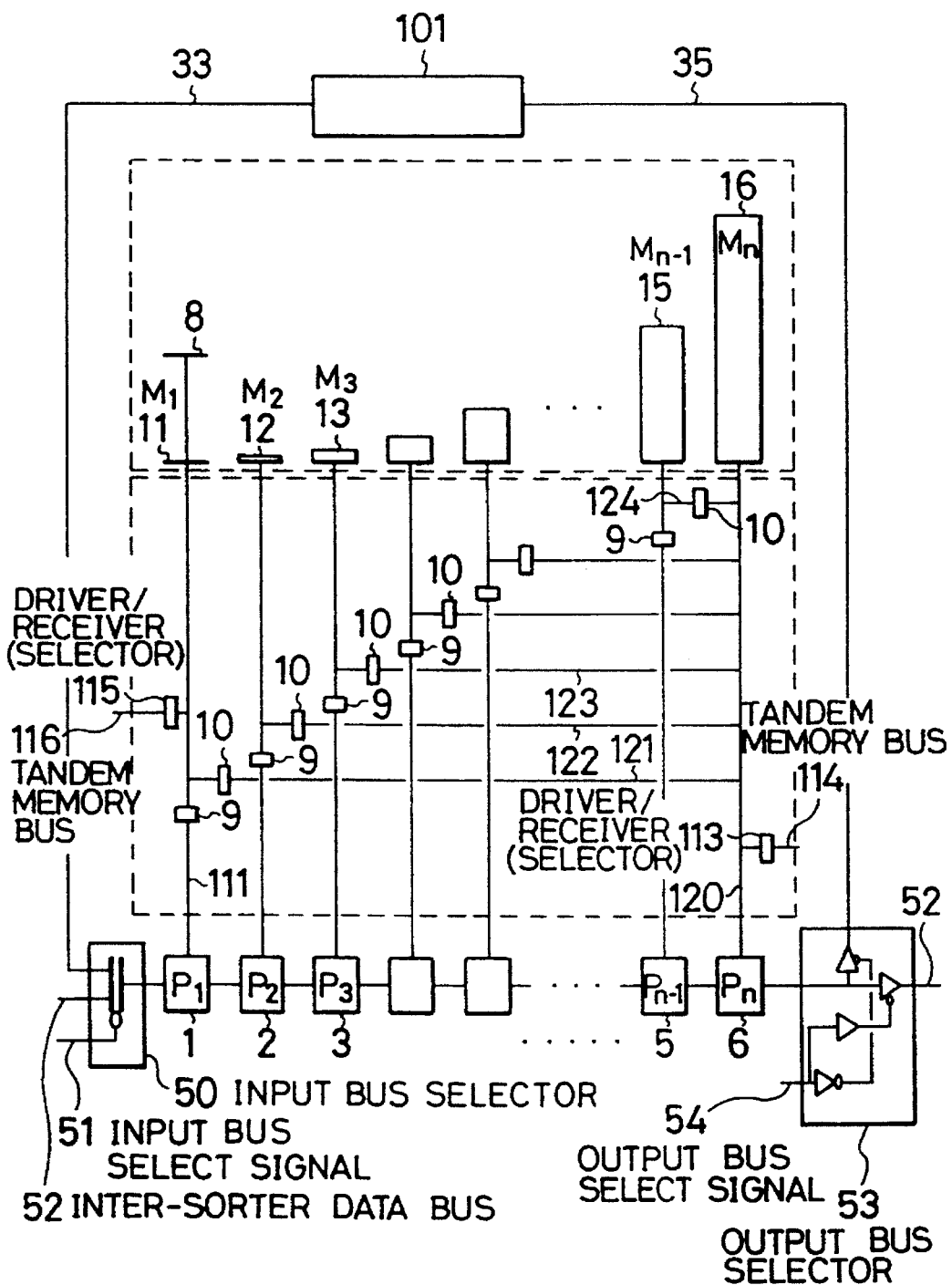
FIG. 10 shows a block diagram of a sorting system configuration of the invention illustrating a hardware merge sorter applicable to operations in tandem in a multi-sorter system according to a third embodiment.

FIG. 10 shows a block diagram of a sorting system configuration of the invention according to another embodiment of the invention illustrating the inventive hardware merge sorter applicable for operations in tandem in a multi-sorter system. FIG. 10 comprises FIG. 1, as modified by adding an input bus selector 50, an input bus select signal 51, an inter-sorter data bus 52, an output bus selector 53, an output bus select signal 54, drivers/receivers 113 and 115 and tandem memory buses 114 and 116.

The hardware merge sorter in FIG. 10 can operate alone or in tandem by controlling the streams of data using the input bus selector 50 and the output bus selector 53. The input bus select signal 51 selects a stream of data transferred from the sort controller 101 or from a sorter in the preceding stage. In other words, the input bus selector 50 outputs a stream of data on the sort data input bus 33 to the local processor $P_1$ 1 when the hardware merge sorter should operate alone. When the sorter should operate in tandem in a multi-sorter system, the input bus selector 50 outputs a stream of data on the inter-sorter data bus 52. The output bus select signal 54 selects a bus for outputting a resulting string of sorted records. In other words, the output bus selector 53 outputs a resulting string of sorted records from the local processor $P_n$ 6 to the sorted data output bus 35 when the sorter should operate alone. When the sorter should operate in tandem in a multi-sorter system, the output bus selector 53 outputs the sorted string to the intersorter data bus 52 for a further operation in a sorter in the next stage. A stream of sorted records on the sorted data output bus 35 is transferred to the sort controller 101 or to the host computer via the channel interface 42 in FIG. 16.

A multi-sorter system can become larger in scale as more inventive hardware merge sorters are connected in tandem by linking the output bus selector 53 of a sorter to the input bus selector 50 of another. Consequently, the amount of data sortable in the system can become larger as the number of the hardware merge sorters increases in a multi-sorter system.

The basic operation of a multi-sorter system is now discussed more specifically when the system has two tandem connected inventive hardware merge sorter cells as shown in FIG. 10. The two-sorter system according to this embodiment can sort N" number of records where N" is $2^{n+1}<N''2^{n+2}$ by utilizing three merge sort steps. Each of the two hardware merge sorters operates individually in the first and second merge sort steps in the same manner as that described in the first embodiment with reference to FIGS. 8 and 9. In the third merge sort step, the sorters are connected in tandem to produce an accomplished string of sorted records for the third sorting step.

In the first merge sort step, the hardware merge sorters share N" number of records and process them serially through the conventional pipeline merge sort operations. In other words, the two hardware merge sorters output one/two string(s) of not more than $2^n$ number of records respectively. Consequently, N" number of records are sorted into three/four strings of initially sorted records and transferred to the sort controller 101.

The three/four strings of initially sorted records in the sort controller 101 are merged into two strings through the second merge sort step and output respectively from the two sorters to the sort controller. According to this embodiment, $2^{n+1}$ number of records from the two strings of $2^n$ number of records, and $N''-2^{n+1}$ number of records from the one/two string(s) are sorted individually in the two sorters. Consequently, the sort controller receives two strings of $2^{n+l}$ and $N''-2^{n+l}$ number of secondly sorted records. The combination of strings processed in a sorter in this stage, however, can be varied among the three/four strings of initially sorted records in the sort controller 101.

In the third merge sort step, the two hardware merge sorters are connected in tandem to perform a merge sort operation jointly on a tandem basis. Operations in this stage are based on those in the second merge sort step of this embodiment involving the unique storage and merge sort operations. For the purpose of the unique operation, the unique local processor $P_n$ 6 should be provided in a sorter in the later stage.

In order to acquire a unified memory of the two sorters on a tandem basis, the tandem memory bus 114 of a sorter in the earlier stage is connected with the tandem memory bus 116 of the other sorter in the later stage. For the purpose of the unique operation in this stage, the local processor $P_n$ 6 of the later sorter or the unique local processor has a unified responsive memory with a storage capacity of $2^{n+1}$ number of records including the local memories $M_1$ 11 through $M_n$ 16 and the supplementary storage 8 of the both sorters. In terms of a successful storage operation, the discussion above with respect to the address/data bus control techniques in FIGS. 2 through 7 should also be considered with respect to this embodiment.

For the unique storage operation in this stage, one of the two secondly sorted strings is input in the local processor $P_1$ 1 of the earlier sorter and then transferred directly to the unique local processor $P_n$ 6 of the later sorter from the sort controller 101. The unique or exclusive local processor $P_n$ 6 transfers the input data to the unified memory. When completing the storage operation, the unique local processor $P_n$ 6 is ready for the unique merge sort operation with the unified memory. The sort controller 101 transfers the remaining string of records directly to the unique local processor $P_n$ 6. The local processor $P_n$ 6 starts to perform the unique merge sort operation with the data. Consequently, an accomplished string of sorted N" ($2^{n+1}<$N"$\leq 2^{n+2}$) number of records are output from the later sorter to the output data bus 35.

Thus, according to this embodiment, 4N number of records are sorted into three/four strings of initially sorted records in the first merge sort step in a multi-sorter system with two hardware merge sorters as shown in FIG. 10 which are connected in tandem. In the second merge sort step, the three/four strings of initially sorted records are merged into two strings of 2N number of secondly sorted records. In a third merge sort step on a tandem basis, the two strings of 2N number of secondly sorted records are merged into an accomplished string of 4N number of thirdly sorted records.

Generally, storage capacity is the only element that limits the maximum number of data sortable in a sorter or multi-sorter system, which can sort twice the amount of data as that of the total storage capacity. In this respect, the amount of data which can be sortable in a multi-sorter system can greatly be expanded as a multi-sorter system expands with more additional sorters implemented in tandem.

With further reference to the first embodiment in reference to FIG. 12, the inventive sorting method is also executable upon a multi-sorter system. FIG. 13 shows conceptual diagrams illustrating the sorting method of the invention executable upon a multi-sorter system operated in tandem. According to this embodiment, the system can process N" number of records in the range of over $2^{n+1}$ and to $2^{n+2}$ ($2^{n+1}<$N"$\leq 2^{n+2}$).

FIG. 13(a) illustrates the first and second merge sort steps operated individually by the two hardware merge sorters in tandem. A hardware merge sorter in the earlier stage is dedicated to operations in the first merge sort step. The other sorter in the later stage is dedicated to operations in the second merge sort step. According to this embodiment, N" number of records are sorted into two strings of secondly sorted records through the first and second merge sort steps involving the two sorters in the manner discussed in the following two steps (S11-1 and S11-2).

S11-1: N" number of records are input in the earlier sorter. The first $2^n$ number of records are sorted into a string $N_1$ of initially sorted $2^n$ number of records. The string $N_1$ is transferred to the later sorter for the unique storage operation in the second merge sort step. Another $2^n$ number of records are consecutively sorted in the earlier sorter into a string $N_2$ of initially sorted $2^n$ number of records. The string $N_2$ is transferred to the later sorter.

The strings $N_1$ and $N_2$ are merged through the unique merge sort operation into a string $N_1+N_2$ of secondly sorted $2^{n+1}$ number of records. The string $N_1+N_2$ is transferred to the sort controller.

S11-2: The remaining N"$-2^{n+1}$ number of records can be shared by two series of operations in the first merge sort step, if necessary, and processed in the same manner as that described in S11-1 and output in a string $N_3(+N_4)$ of secondly sorted N"$-2^{n+1}$ number of records to the sort controller.

FIG. 13(b) illustrates the third or tandem based merge sort step operated in tandem by a set of the two sorters. The operations in the third merge sort step of this embodiment is the same as those described in the third or tandem based merge sort step in the third embodiment. The secondly sorted strings $N_1+N_2$ of $2^{n+1}$ number of records and $N_{3(+N4)}$ of N"$-2^{n+1}$ number of records are sorted in the manner described in the following two tandem based steps of the unique storage operation (S12-1) and the unique merge sort operation (S12-2).

S12-1: One of the strings $N_1+N_2$ and $N_{3(+N4)}$ of secondly sorted records are transferred from the sort controller directly to the unique local processor of the later sorter through the earlier sorter and stored in the unified memory of the both sorters.

S12-2: The remaining string is then transferred from the sort controller directly to the unique local processor. The string of records are merged with the string in storage through the unique merge sort operation into an accomplished string of N" ($2^{n+1}<$N"$\leq 2^{n+2}$) number of sorted records.

Embodiment 4.

With further reference to FIG. 10, the inventive hardware merge sorter can have a private bus for transferring sort data from the sort controller directly to the local memories in the hardware merge sorter in the storage operation in the second merge sort step.

Figure 11:
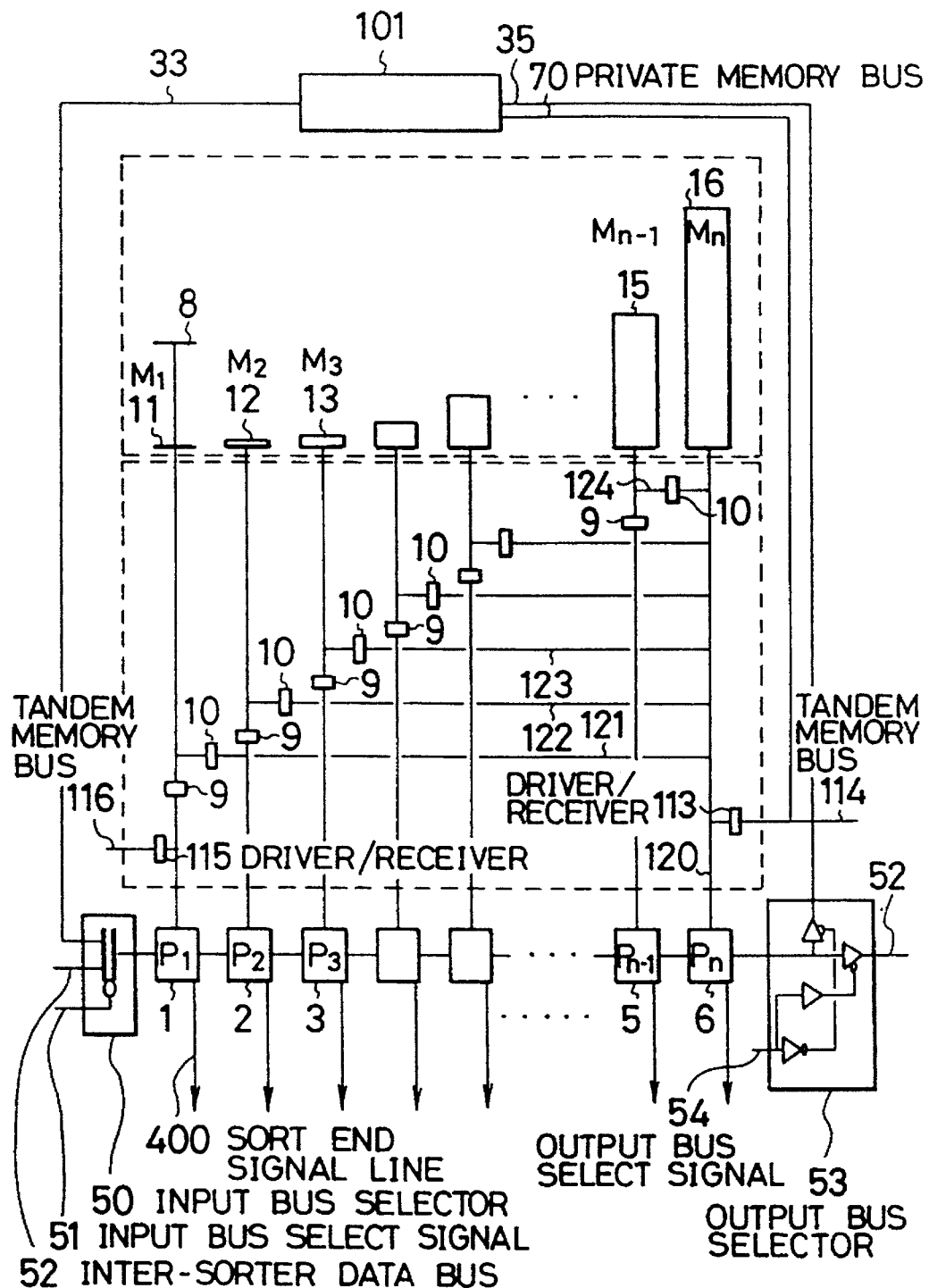
FIG. 11 shows a block diagram of a sorting system configuration of the invention illustrating another hardware merge sorter applicable to operations in tandem in a multi-sorter system according to fourth and sixth embodiments.

FIG. 11 shows a block diagram of a sorting system configuration of the invention according to another embodiment illustrating another hardware merge sorter applicable to operations in tandem in a multi-sorter system. FIG. 11 comprises FIG. 10, as modified by adding a private memory bus 70. The private memory bus 70 transfers sort data directly to the local memories in the sorter through the local memory bus 120 from the sort controller 101 and the local address/data buses 121 through 124. The driver/receiver 113 is an interface for connecting the private memory bus 70 with the local memory bus 120.

According to this embodiment, the sort controller 101 transfers one of the two strings of initially sorted records resulted from the first merge sort step directly to the local memories $M_1$ 11 through $M_n$ 16 and the supplementary memory 8 through the private memory bus 70 for the storage operation in the second merge sort step. The unique merge sort operation performed thereafter in the second merge sort step is the same as that stated in the first embodiment in reference to FIG. 9.

Embodiment 5.

Figure 14A:
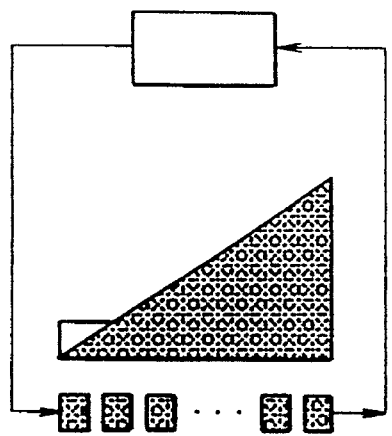
FIG. 14 shows conceptual diagrams illustrating the inventive sorting method for smaller files according to a fifth embodiment.
Figure 14B:
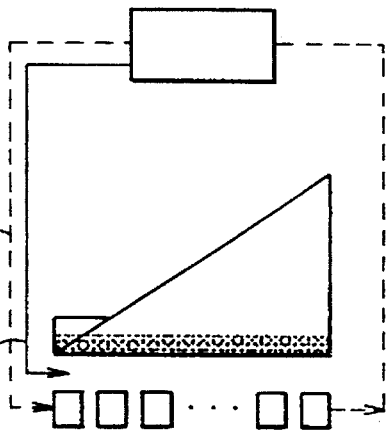
Figure 14C:
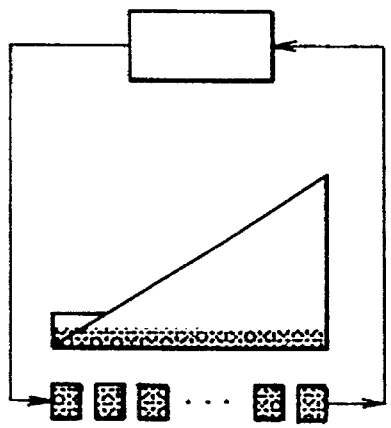

With further reference to the first embodiment, the inventive sorting method is applicable to smaller files. FIG. 14 shows conceptual diagrams illustrating a sorting method of the invention executable upon the conventional hardware merge sorter. According to this embodiment, $2^n+n$ number of records are processed through the following three steps. The Inventive sorting method according to this embodiment, however, is applicable to sorting any number of records over $2^n$. FIGS. 14(a), 14(b) and 14(c) show the first, second and third steps respectively.

In a first step (Step 1) in FIG. 14(a), $2^n$ number of records are processed through a series of the conventional pipeline merge sort operations and output in a string of initially sorted $2^n$ number of records to the sort controller.

In a second step (Step 2) in FIG. 14(b), the remaining n number of pre-sorted records are stored in the local memories in the manner that each local memory receives one record through n number of pipeline stages. In terms of a storage operation in this step, a successful record transfer from the sort controller can be achieved by an address flag with each record, and otherwise a private storage bus can be provided for storing the records directly to the local memories from the sort controller.

In a third step (Step 3) in FIG. 14(c), a resulting string of initially sorted $2^n$ number of records from Step 1 are input in the hardware merge sorter in Step 2. The n number of records in storage are merged one by one into the string of the initially sorted $2^n$ number of records through a series of pipeline merge sort operations. Consequently, the hardware merge sorter outputs an accomplished string of $2^n+n$ number of sorted records.

When the number of records exceeds $2^n+n$, the combination of Step 2 and Step 3 is to be repeated until there are no more merges possible. In other words, $2^n+k \times n$ number of records would be processed through Step 1 once and then 'k' times of a set of Step 2 and Step 3 (k×n<$2^n$). This sorting method is desirable for the amount of data $2^n$.

FIG. 15 shows a concrete example of pipeline merge sort operations performed in Step 3 in FIG. 14(c). The figure illustrates how a record in storage is merged into an input string of sorted records in the ascending order in a pipeline stage involving the local processors.

In FIG. 15(a), the local processor $P_1$ in the first pipeline stage inputs a string of sorted records and a record with a value 5 in storage and sorts them in the ascending order. In FIG. 15(b), the resulting sorted string of records with the 5 in between a 3 and a 6 is then input in the local processor $P_2$ in the next pipeline stage. The local processor $P_2$ merges a record with a value 2 in storage into a sorted string transferred from the local processor $P_1$. The resulting string of sorted records with the 2 in storage in between a 1 and a 3 is output from the local processor $P_2$ to the local processor $P_3$ in the next pipeline stage. Thus, records in storage in Step 2 are repeatedly merged into a string in each pipeline stage until there are no record remains in the local memories.

According to this embodiment, the inventive sorting method can sort data in the range of over $2^n$ to $2^n+n$ number of records through two different series of pipeline merge sort operations Involving the three steps with the conventional merge sorter having n number of pipeline stages capable of sorting $2^n$ number of records.

Embodiment 6.

With further reference to the embodiments hereinbefore, the sorting system and method of the invention can achieve an earlier start of the storage operation in the second merge sort step by providing a sort end signal and a sort end signal line 400 as shown in FIG. 11 in each pipeline stage. There should be potential idle time between the first and second merge sort steps and more specifically before the unique storage operation. According to the first embodiment, for example, the start of the storage operation has to be postponed until the local processor in the last pipeline stage completes the final merge sort operation in the first merge sort step. Meanwhile, the local processors in the earlier pipeline stages remain free or idle when completing a merge sort operation in their own pipeline stages. According to this embodiment, a storage operation in the second merge sort step can start when the local processor in the first pipeline stage has completed a merge sort operation by outputting a resulting string of sorted records to the local processor in the next pipeline stage. In other words, the local processor in each pipeline stage informs the sort controller of the end of its merge sort operation in the pipeline stage by the sort end signal. On the reception of the sort end signal, the sort controller transfers data to the local processor for storage through the sort data input bus 33. This means that the local processor can store data for a merge sort step just after the local processor completed a merge sort operation in the first merge sort step. This can save time by reducing the idle time.

Thus, the inventive sorting system and method according to this embodiment are characterized by the earlier start of the storage operation in the second merge sort step, which can contribute to higher speed sorting.

Embodiment 7.

With further reference to the fifth embodiment, the sorting system and method of the invention can achieve an earlier start of pipeline merge sort operations in Step 3 in FIG. 14(c) by parallelling the pipeline merge sort operations in Step 3 to the storage operation in Step 2 in FIG. 14(b). There should be potential idle time between a storage operation in Step 2 and a merge sort operation in Step 3. According to this embodiment, the sort controller 101 can transfer records for a merge sort operation in Step 3 in the midst of a storage operation in Step 2. Each local processor can start to perform a merge sort operation when the local processor has received a resulting string of records from the preceding stage as well as the responsive local memory has received a record. Thus, the pipeline merge sort method is optimal for Step 3 in this embodiment in terms of improved sorting speed. This can also save time by reducing the idle time.

Thus, the inventive sorting system and method according to this embodiment are characterized by the parallel operations due to an earlier start of a merge sort operation, which contribute to higher speed sorting.

Embodiment 8.

With further reference to the embodiments hereinbefore, the sorting system and method of the invention can be provided with a modified storage or local memories under the condition that the total storage capacity of $2^n$ number of records should not be changed. One of the possible modifications is to give a storage n/2 (n is an even number) number of pipeline stages. In this case, each pipeline stage has a storage capacity of $2^{n-1}+1$ number of records and should access two of n number of local processors.

This idea is applicable to a multi-sorter system with two hardware merge sorters in tandem for example. One of the possible modifications is to give a unified storage of two sorters n number of pipeline stages. In this case, each pipeline stage has a storage capacity of $2^{n-1}+1$ number of records and should access two of 2n number of local processors of two sorters.

What is claimed is:

1. A sorting system for sorting a plurality ($N \leq 2^{n+1}$) of records, comprising:

a hardware merge sorter, including:

a plurality n of local processors cascaded in series, wherein each of said local processors ($p^i$ where i=0,1 . . . n-1) receives two strings of $2^{i-1}$ records, merges and sorts the two strings into a sorted data-string of $2^i$ records, and outputs said sorted data-string so that said hardware merge sorter produces a first sorted data-string of $2^n$ records and a second sorted data string of $N-2^n$ records during a first sorting through the hardware merge sorter;

a memory having a storage capacity of $2^n$ number of records, including a plurality of local memories;

a plurality of selectors, each selector coupled to and between one of the plurality of local memories and a respective local processor, for coupling the plurality of local memories to the plurality of local processors during said first sorting, and for coupling the plurality of local memories to one local processor of the plurality of local processors for a second sorting; and a controller for controlling said plurality of local processors and said plurality of selectors so that said hardware merge sorter produces the sorted data-strings of N number of records during said first sorting, and produces an output sorted data-string of 2N number of records during said second sorting.

2. The sorting system according to claim 1, wherein at least two of said plurality of local memories each have a storage capacity of $2^{n-1}$ number of records, and wherein said selectors couple said at least two local memories to said one local processor during said second sorting.

3. The sorting system according to claim 1 or 2, further comprising a private memory bus coupled between said controller and said plurality of selectors for transferring one of said first and second sorted data-strings from said controller to said local memories for said second sorting.

4. The sorting system according to claim 1, wherein one of said first and second sorted data-strings is stored in each local memory that is available while said first sorting is still being performed.

5. The sorting system according to claim 4, wherein said second sorting is initiated in each local processor upon receipt of one of the first and second sorted data strings and the storage of said other one of the first and second sorted data-strings in the respective local memory.

6. The sorting system according to claim 1, wherein each of said local memories has a storage capacity of $2^{n-1}+1$ number of records, and each of said local memories is accessed by two of said local processors.

7. The sorting system according to claim 1, further comprising sort end signal lines disposed between each respective plurality of local processors and the controller, so that each respective processor can inform the controller when it has completed the first sorting and the controller can store a portion of one of the first sorted data string and the second data-string in the respective local memory.

8. The sorting system as claimed in claim 1, wherein each local memory has a stored capacity $2^i$ number of records.

9. A sorting system for sorting a plurality ($2^{n+1} \leq N \leq 2^{n+2}$) of records, comprising:

at least two hardware merge sorter cells cascaded in series, each hardware merge sorter cell including:

a plurality (n) of local processors cascaded in series, wherein each of said local processors (Pi, where i=0,1 ... n−1) receives two strings of $2^{i-1}$ records, merges and sorts the two strings into a sorted data-string of $2^i$ records, and outputs said sorted data-string so that said hardware merge sorter cell produces a first sorted data-string of $2^n$ records and a second sorted data string of $N-2^{n+1}$ records during a first sorting through said hardware merge sorter cell;

a memory having a storage capacity of $2^n$ number of records, including a plurality of local memories;

a plurality of selectors, each selector coupled to and between one of the plurality of local memories and a respective local processor, for coupling the plurality of local memories to the plurality of local processors during said first sorting, for coupling said plurality of local memories to a one local processor of the plurality of local processors for the second sorting, and for coupling the plurality of local memories to one local processor of the plurality of local processors in the at least two hardware merge cells for a third sorting;

a plurality of input/output bus selectors cascaded in series with the plurality of local processors, for connecting said hardware merge sorter cells; and a controller for controlling said plurality of local processors, said plurality of selectors and said input/output bus selectors to sort the plurality of records into four sorted data-strings of N number of records during said first sorting, to further sort said four sorted data-strings into two sorted data strings of 2N number of records during said second sorting, and to sort said two sorted data-strings into a sorted data-string of 4N number of records during said third sorting.

10. The sorting system according to claim 9, further comprising a private memory bus coupled between said controller and said plurality of selectors for transferring two of said four initially sorted data-strings from said controller to said local memories for said second sorting.

11. The sorting system according to claim 9, wherein one of said four initially sorted data-strings is stored in each local memory that is available of each sorter cell for said second sorting while said first sorting is still being performed.

12. The sorting system according to claim 9, wherein each of said local memories has a storage capacity of $2^{n-1}+1$ number of records, and each of said local memories is accessed by two of said local processors in each of said hardware merge sorter cells.

13. The sorting system as claimed in claim 9, wherein each local memory has a stored capacity $2^i$ number of records.

14. The sorting system according to claim 9, further comprising sort end signal lines disposed between each respective plurality of local processors and the controller, so that each respective processor can inform the controller when it has completed the first sorting and the controller can store a portion of one of the first sorted data string and the second data-string in the respective local memory.

15. A method for sorting a plurality ($N \leq 2^{n+1}$) of records, using a hardware merge sorter including a plurality (n) of local processors, a plurality of local memories and a plurality of selectors, each selector of the plurality of selectors being coupled to and disposed between one of the plurality of local memories and a respective local processor, for coupling each local memory of the plurality of local memories to the respective local processor during a first sorting step, and for coupling said plurality of local memories to one local processor of the plurality of local processors during a second sorting step, said method comprising the steps of:

(A) sorting $2^n$ number of records into a first sorted data-string, using each of said local processors and each of said local memories during said first sorting step;

(B) sorting a remaining $N-2^n$ number of additional records into a second data-string during said first sorting step;

(C) storing one of said first and said second sorted data-strings in said plurality of local memories;

(D) sorting the other of the first and second sorted data-strings and said stored one of the first and second data-strings, with said one local processor, so as to produce a sorted data-string of 2N number of records during said second sorting step.

16. The method of claim 15 wherein the step of storing one of said first and second sorted data-strings is started, while said step of sorting a remaining $N-2^n$ number of additional records into a second data-string is still being performed.

17. A method for sorting a plurality ($2^{n+1} \leq N \leq 2^{n+2}$) of records using at least two hardware merge sorter cells, each hardware merge sorter cell including a plurality (n) of local processors, a plurality of local memories, a plurality of selectors, each selector of the plurality of selectors being coupled to and disposed between one of the plurality of local memories and a respective local processor for coupling each local memory of the plurality of local memories to the respective local processor during a first sorting step, for coupling said plurality of local memories to one local processor of the plurality of local processors during a second sorting step, and for coupling the plurality of local memories to one local processor, of the plurality of local processors in the at least two hardware merge cells, during a third sorting step and a plurality of input/output bus selectors cascaded in series with the plurality of local processors, which connect said hardware merge sorter cells during a third sorting step, said method comprising the steps of:

(A) sorting $2^n$ number of records into a first sorted data-string, using each of said local processors and each of said local memories in said first hardware merge sorter cell during said first sorting step;

(B) sorting with said first merge sorter cell $2^n$ number of additional records into a second data-string during said first sorting step;

(C) sorting with said second merge sorter cell the first and second sorted data-strings so as to produce a first 2N number of records sorted data-string, during said second sorting step;

(D) sorting a remaining $N-2^{n+1}$ number of records into a second 2N number of records sorted data-string, using steps of (A) to (C);

(E) storing one of said first and second sorted 2N number of data-strings in said plurality of local memories in said first and second hardware merge sorter cells during said third sorting step; and, (F) sorting the other of the first and second 2N number of data-strings and the stored one of the first and second 2N number of data-strings so as to produce a 4N number of records data-string, during said third sorting step.

18. The method as claimed in claims 17 or 19, wherein the step of storing one of the said first and second sorted 2N number of dated data-strings in said plurality of local memories in said first and second hardware merge sorted cells is started while said step of sorting the remaining $N-2^{n+1}$ number of records into a second 2N number of records sorted data-string is still being performed.

19. A method for sorting a plurality ($2^{n+1} \leq N \leq 2^{n+2}$) of records, using at least two hardware merge sorter cells, each hardware merge sorter cell including a plurality of (n) local processors, a plurality of local memories, a plurality of selectors each selector of the plurality of selectors being coupled to and disposed between one of the plurality of local memories and a respective local processor, for coupling each local memory to the respective local processor during a first sorting step, for coupling said plurality of local memories to one local processor of the plurality of local processors during a second sorting step, and for coupling the plurality of local memories to one local processor of the plurality of local processors in the at least two hardware merge cells during a third sorting step and a plurality of input/output bus selectors cascaded in series with the plurality of local processors which connect said hardware merge sorter cells during said second and third sorting steps, said method comprising the steps of:

(A) sorting $2^n$ number of records into a first sorted data-string, using each of said local processors and each of said local memories in a first hardware merge sorter cell during said first sorting step;

(B) storing said first sorted data-string in said plurality of local memories of a second hardware merge sorter cell;

(C) sorting $2^n$ number of additional records into a second data-string during said first sorting step in said first hardware merge sorter cell;

(D) sorting, during said second sorting step, said second sorted data-string and said stored first sorted data-string stored in said second hardware merge sorter cell so as to produce a first 2N number of records sorted data-string;

(E) sorting a remaining $N-2^{n+1}$ number of other records into a second 2N number of records sorted data-string, using said first and second hardware merge sorter cells by repeating steps (A) to (D);

(F) storing one of said first and second 2N number of records data-strings in said plurality of local memories in said first and second hardware merge sorter cells during said third sorting step; and, (G) sorting the other of the first and second 2N number of data-strings and the stored one of the first and second 2N number of data-strings so as to produce a 4N number of sorted records data-string during said third sorting step.

20. A method for sorting a plurality ($N \geq 2^n + n$) of records, using a hardware merge sorter including a plurality (n) of local processors, and a plurality of local memories, said method comprising the steps of:

(A) sorting 2n number of records into a first sorted data-string, using each of said local processors and each of said local memories during a first sorting step;

(B) storing one record out of a remaining (n)number of records in each of said local memories;

(C) sorting the first sorted data-string and said remaining number of records, stored in said plurality of local memories, in a second sorting step; and (D) for a number of records exceeding $2^n + n$, repeating steps (B) and (C) to produce a string of a sorted number (N) of records.

21. The method of claim 20, wherein the step of storing the one record in each of the plurality of local memories is started, while said step of sorting said $2^n$ number of records is still being performed.

22. The method of claim 20, wherein the step of sorting the first sorted data-string and the remaining number of records, stored in each of said plurality of local memories, is started while said step of sorting said remaining number of records is still being performed.

* * * * *